US010303495B2

(12) United States Patent
Nishi et al.

(10) Patent No.: US 10,303,495 B2
(45) Date of Patent: May 28, 2019

(54) ROBOT SYSTEM INCLUDING CNC AND ROBOT CONTROLLER CONNECTED THROUGH COMMUNICATION NETWORK

(71) Applicant: FANUC CORPORATION, Yamanashi (JP)

(72) Inventors: Hiroji Nishi, Yamanashi (JP); Masahiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 15/335,453

(22) Filed: Oct. 27, 2016

(65) Prior Publication Data

US 2017/0123820 A1 May 4, 2017

(30) Foreign Application Priority Data

Oct. 28, 2015 (JP) .................................. 2015-212070

(51) Int. Cl.
*G06F 9/451* (2018.01)
*G05B 19/418* (2006.01)
(Continued)

(52) U.S. Cl.
CPC ............ *G06F 9/451* (2018.02); *B25J 9/1656* (2013.01); *G05B 19/409* (2013.01);
(Continued)

(58) Field of Classification Search
CPC combination set(s) only.
See application file for complete search history.

(56) References Cited

U.S. PATENT DOCUMENTS 6,396,030 B1 * 5/2002 Hashimoto ........ G05B 19/0423
219/490
2006/0010006 A1 * 1/2006 Kreidler ............. G05B 19/4183
705/400
(Continued)

FOREIGN PATENT DOCUMENTS

CN 202865113 U 4/2013
CN 204209495 U 3/2015
(Continued)

OTHER PUBLICATIONS

G. Calvary et al., "The CAMELEON Reference Framework", CAMELEON Project R&D Project IST-2000-30104, Sep. 3, 2002.
(Continued)

*Primary Examiner* — Doon Y Chow
*Assistant Examiner* — Wendy Nicholas
(74) *Attorney, Agent, or Firm* — Hauptman Ham, LLP

(57) ABSTRACT

A robot system preventing a worker from mistaken operation due to mistaken assumptions resulting from differences in operation of the GUIs. The robot system includes a machine attribute value storage part storing a combination of values corresponding to attributes of types, appearances, and display positions for addition of display elements of the robot on the GUI screen of the display device and a combination of values corresponding to attributes of various definition types of both operations and responses of the display elements and includes a machine screen generation part using a combination of values corresponding to attributes stored in the machine attribute value storage part as the basis to generate and add display elements of the robot to the GUI screen of the machine. The machine screen generation part is configured to generate the GUI screen of the display device including the display elements of the robot.

2 Claims, 28 Drawing Sheets

(51) Int. Cl.
*G06T 7/00* (2017.01)
*G06K 9/32* (2006.01)
*B25J 9/16* (2006.01)
*G05B 19/409* (2006.01)

(52) U.S. Cl.
CPC ....... *G05B 19/41825* (2013.01); *G06K 9/325* (2013.01); *G06T 7/0002* (2013.01); *G05B 2219/36163* (2013.01); *G06K 2209/01* (2013.01); *G06T 2200/24* (2013.01); *Y02P 90/087* (2015.11); *Y02P 90/14* (2015.11); *Y02P 90/18* (2015.11)

(56) References Cited

U.S. PATENT DOCUMENTS

| | | | | |
|---|---|---|---|---|
| 2009/0070404 | A1* | 3/2009 | Mazzaferri | G06F 9/542 709/202 |
| 2010/0305758 | A1 | 12/2010 | Nishi et al. | |
| 2013/0055135 | A1* | 2/2013 | Keller | G06F 9/451 715/771 |
| 2013/0166068 | A1* | 6/2013 | Yanagita | G05B 19/4083 700/245 |
| 2014/0316565 | A1 | 10/2014 | Aoyama | |
| 2014/0336786 | A1* | 11/2014 | Asenjo | G05B 19/4185 700/17 |

FOREIGN PATENT DOCUMENTS

| | | |
|---|---|---|
| CN | 204297669 U | 4/2015 |
| JP | 2-51720 A | 2/1990 |
| JP | 6-149329 A | 5/1994 |
| JP | 6-168020 A | 6/1994 |
| JP | 9-244727 A | 9/1997 |
| JP | 2004-86311 A | 3/2004 |
| JP | 3978233 B2 | 9/2007 |
| JP | 2010-102465 A | 5/2010 |
| JP | 2010-277425 A | 12/2010 |
| JP | 2015-168038 A | 9/2015 |
| WO | 2007/018753 A1 | 2/2007 |

OTHER PUBLICATIONS

Jose Manuel Cantera Fonseca, "Model-Based UI XG Final Report", W3C Incubator Group Report, May 4, 2010.
Jeff Johnson, "Designing with the Mind in Mind, Second Edition" Chapter 2, MK.
Don Norman, "The Design of Everyday Things: Revised and Expanded Edition", Chapter 4 and 5, Word Wise.
Tsung-Hsiang Chang et al., "Associating the Visual Representation of User Interfaces with their Internal Structures and Metadata", UIST' 11, Oct. 16-19, 2011, Santa Barbara, CA, USA.
Shujiro Ikeda et al., "Binarization based on Conditional Image Enhancement and Character Stroke Width for Low-Quality Document", proceedings of the 2014 General Conference of the Institute of Electronics, Information and Communication Engineers, Mar. 18-21, 2014, Niigata, Japan, for which English summary is attached.
M. Elad et al., "Simultaneous cartoon and texture image inpainting using morphological component analysis (MCA)", Applied and Computational Harmonic Analysis, vol. 19 (2005), Elseview Inc., Aug. 15, 2005, pp. 340-358.

* cited by examiner

ROBOT SYSTEM INCLUDING CNC AND ROBOT CONTROLLER CONNECTED THROUGH COMMUNICATION NETWORK

RELATED APPLICATIONS

The present application claims priority to Japanese Patent Application Number 2015-212070 filed Oct. 28, 2015, the disclosure of which is hereby incorporated by reference herein in its entirety.

BACKGROUND ART

1. Field of the Invention

The present invention relates to a robot system including a machine and a robot using CNC.

2. Description of Related Art

In recent years, systems have been proposed for automating processes of production by linking machine tools or other machines using CNC (computer numerical control) with robots. Such automated systems enable an increase of the amount of production without increasing the number of workers at the factory. These are proactively introduced when redesigning parts of manufacture processes to increase the amount of production, when building new factories, etc.

In the manufacture processes operated by such automated systems, sometimes a robot is checked for status and operated from a streamlined control panel of a PLC (programmable logic controller) of the factory or a GUI (graphical user interface) of a display of a using CNC machine using CNC. Due to this, the worker at the factory can concentrate on the operation of the using CNC machine using CNC, for example, a machine tool, or can perform other works in parallel with processing by the machine.

For example, the patent literature Japanese Patent Publication No. H06-149329A discloses that a machine tool operates so as to edit and start up a robot program and to jog a robot. However, Japanese Patent Publication No. H06-149329A does not particularly describe any desired screen interfaces for the machine operation. Japanese Patent Publication No. 2010-277425A discloses a processing system equipped with a screen GUI of the teach pendant of the robot for operating a machine tool. Due to this, the operator can check the status of the machine tool and can control a part of the operations of the machine tool from the robot.

For a factory worker, robots are classified into two types. One type of robot directly processes a product. For this reason, the amount of production and the quality of each product depend on the performance and the application method of the robot. The other type of robot does auxiliary works, for example, picks and places a workpiece, changes tools for itself or a machine automatically, or washes workpieces or tools in the production process. In this case, a machine tool or some machines process the product.

As the former application examples, there are the robot arc welding for a machine part and the robot spot welding for an automobile chassis manufacture process. In these cases, unless operating the robot as intended, some quality problems are liable to occur and large amounts of defect products may be produced. Therefore, a worker of a factory is motivated to carefully study the methods to operate the robot. Further, a manager of the worker tends to willingly assign a sufficient time to study the robot operation during working hours.

In the latter case, the situation differs. The product is processed by a machine using CNC etc., so the worker has to accurately understand how to operate the machine and to have the sufficient knowledge of the processing itself. Further, if the worker cannot use the various functions to assist the processing in the machine operation, it is not possible to execute the processing with satisfying the desired quality and finishing it with a short time, and without reworking. For example, when using a machining center, the worker has to pay close attention to various matters such as knowledge for suitably serving the workpiece, using CAD/CAM to output some NC programs, adjusting the flow of the coolant, preparing of a suitable fixture for the workpiece, and compensating of the tool length for the worn tools.

When operating such a machine using CNC, the worker tends to feel the robot is nothing but repeating the same work under the same condition. Further, the manager of the worker interprets that the product quality is independent from the robot as long as the robot works rightly, so also tends to get the same impression.

As a result, the worker or the manager tends to conclude that it is sufficient to memorize one or two routines required for usual production operation and tends not to carefully read the instruction manual of the robot. The supplier of the robot cannot criticize for this. The reason is that if the management cost of the introduction and the operation of the robot cancels out the improvement in the factory overall productivity, the worth of introduction of the robot would be lost.

So long as the robot works rightly, no problem arises even if the worker doesn't master the robot. However, if the worker or manager needs to reevaluate the whole work of the robot in order to improve the whole processes, because of the voluminous instruction manual, finding the related explanations needs for the massive time, even if the person needs some small changes.

Further, a worker usually concentrates on various works without paying much attention to the robot. So if something happens and then the robot stops, the worker sometimes takes this as an unexpected event and would become psychologically stressed out. Furthermore, the GUI design of the robot differs from the GUI design of the machine using CNC which the worker usually uses. Therefore some human errors possibly occur during the unfamiliar work and the person may not smoothly resume the normal conditions (for human error, in particular see "The Design of Everyday Things Revised and Expanded Edition", Donald A Norman, Chapter 4. Know what to do—constraints, discoverability, and feedback, Chapter 5. Human Error? No, Bad Design).

Some proposals have been made for switching one GUI screen of either the machine using CNC or the robot about any appearance and definitions both operations and responses. For example, Japanese Patent Publication No. 6-168020A discloses the art of switching the display state of the machine using CNC. International Publication No. WO2007/018753A discloses the art of changing the frame in the HTML (hyper text markup language) file and changing the layout of the display elements within the frame. Japanese Patent Publication No. 2-051720A discloses the method of changing the key layout when the touch panel displays a user input region of keys.

In this regard, even if various methods or software can be utilized for assisting the construction of a GUI, if two GUIs are designed by different designers for different purposes and different applications, in general the final specifications of the two GUIs will greatly differ. Therefore, a worker familiar with use of one GUI would find it difficult to master the other GUI without relying on the instruction manual or guidance from a more experienced person.

To deal with such a problem, in the same way as the related art disclosed in Japanese Patent Publication No. 6-149329A, there is the method that either or both the supplier of the machine using CNC and the developer of the GUI of the machine integrate a design of a GUI for operating both the machine and the robot, and provide the product including the integrated GUI. Due to this, it would become possible to operate the robot by the same ease of use as when operating the machine.

However, in this case, using CNC machine using CNC providing the integrated GUI would increase the cost of the whole machine system. Finally costumers would bear the increased cost. For this reason, in actuality, it is rare for either or both a supplier or a developer to develop an integrated GUI for operating both the machine and a robot and to provide it to customers.

SUMMARY OF INVENTION

In general, it is expected that a worker would feel it hard to use a robot in the following two cases: First, in the original GUI screen of the robot, known GUI design guidelines for humans were not applied, so it was difficult to master the robot operations. Second, since the worker was mastered in the use of the GUI screen of the display device of the machine using CNC, then he would tend to make mistaken assumptions in the robot operations due to the differences in operations between the two GUIs. The present invention is able to deal with the latter problem.

According to the present invention, there is provided a robot system including a machine using CNC, a robot controller connected to the CNC via a communication network, and a display device displaying a GUI screen of the machine, wherein the robot system includes a machine attribute value storage part storing a combination of values corresponding to attributes of the display element types, appearances, and display positions to add the display elements of the robot into the GUI screen of the display device and a combination of values corresponding to attributes of various definition types of both operations and responses and a machine screen generation part generating the display elements of the robot by using the attribute values stored in the machine attribute value storage part and adding it into the GUI screen of the machine. So, the state of the robot is enabled to be confirmed from the machine and the robot is enabled to be operated from the machine in the robot system, wherein when the machine attribute value storage part stores combinations of values corresponding to attributes of the display element types, appearances, display positions, and various definition types of both operations and responses relating to both the machine and the robot, wherein the machine screen generation part is configured to generate the GUI screen of the display device including the display elements of the robot, and when the CNC is communicating to the robot controller.

In a preferred embodiment, the robot controller includes a robot attribute value storage part for adding display elements operation, which stores attribute values of the display element type and appearances and, definitions of both feasible operations and responses, into the GUI screen of the display device of the machine in order to control the robot.

The robot system further includes a first transmitter part transmitting attribute values of the machine attribute value storage part to the robot controller.

And the robot controller further includes a first generation part matching the attribute values of the display element types and appearances and feasible actions and feedbacks to the GUI screen of the display device, by comparing the transmitted the attribute values with the stored attribute values in the robot attribute value storage part, and a second generation part specifying attribute values of the display positions of each display element by extracting the arrangement rules of the display elements in the region of the GUI screen of the display device, which region is separated in accordance by at least utility or purpose by analyzing the attribute values of the display positions from the transmitted attribute values, and applying the rule to the display positions of the display elements stored in the robot attribute value storage part.

The machine attribute value storage part in the robot system is configured to reflect the transmitted attribute values of the appearances of the display elements and to match the definitions of both feasible operations and responses and to arrange the attribute values of the display positions of each display element for the robot operation via the communication network.

The machine screen generation part is updated to the GUI screen of the display device when the attribute values of the machine attribute value storage part change.

In a preferred embodiment, the robot controller further includes a robot attribute value storage part for adding display elements and various definition types of both operations and responses into the GUI screen of the display device of the machine in order to control the robot.

The robot system further includes a display device GUI screen capture processing part by which the machine captures the GUI screen of the display device to obtain screen capture image data.

a second transmitter part transmitting the screen capture image data from the display device GUI screen capture processing part via the communication network to the robot controller, a third generation part by which the robot controller analyzes the transmitted screen capture image data to identify the appearances, display positions, and types of the display elements of the GUI screen of the display device, specifies the attribute values of the appearances of the display elements stored in the robot attribute value storage part to match the appearances identified from the screen capture image data, and a fourth generation part extracting an arrangement rule of the display elements at the region of the GUI screen of the display device, which region is separated by at least utility or purpose by analyzing of the positions of the display elements identified from the screen capture image data, applying it to the display elements stored in the robot attribute value storage part.

The machine attribute value storage part is configured to reflect the attribute values of the display elements and to match the appearances of the display elements of the GUI screen of the display device and the combination of attribute values of the display positions of each display element of the robot prepared via the communication network, The machine screen generation part is configured to update a GUI screen of the display device when the attribute values of the machine attribute value storage part are changed.

In a preferred embodiment, the second transmitter part is configured to transmit screen capture image data obtained periodically by the display device GUI screen capture processing part via the communication network to the robot controller, the fourth generation part is configured to analyze the newly acquired screen capture image data compared with the obtained past image data each time the robot controller acquires it, identify the content of the operational response of the GUI screen of the display device, and specify attribute values of the various definition types of both operations and responses stored in the robot attribute value storage part.

The machine attribute value storage part is configured to reflect the attribute values of the various definition types of both operations and responses relating to the robot via the communication network.

BRIEF DESCRIPTION OF THE DRAWINGS

These and other objects, features, and advantages of the present invention will become clearer by referring to the detailed description relating to illustrative embodiments of the present invention shown in the attached drawings.

DETAILED DESCRIPTION

Below, embodiments of the present invention will be explained with reference to the attached drawings. The component elements of the illustrated embodiments are suitably changed in scale. The same reference notations are used for the same or corresponding component elements.

Figure 1:
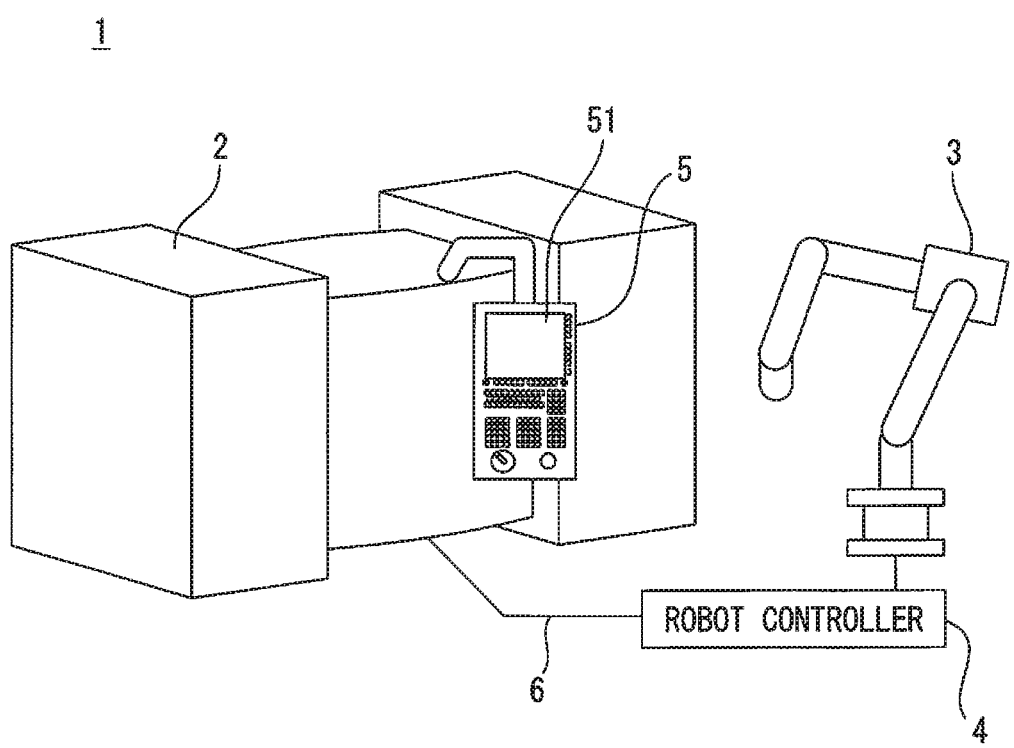
FIG. 1 is a view showing an example of the configuration of a robot system according to an embodiment.

FIG. 1 is a view showing an example of the configuration of a robot system according to an embodiment. The robot system 1 includes a machine 2 using CNC (computer numerical control), a robot 3, and a robot controller 4 controlling the robot 3. Further, as shown in FIG. 1, the machine 2 includes a display device 5 having a GUI screen 51.

The robot system 1 according to the present embodiment, as explained later, is designed to be able to confirm the status of the robot 3 or operate the robot 3 via a communication network 6 by operating the GUI screen 51 of the machine 2.

The machine 2 using CNC is not particularly limited, but for example may be an NC lathe, NC milling machine, machining center (MC), turning center (TC), grinding machine, grinding center, bobbing machine, gear cutting machine, gear grinding machine, gear finishing machine, die sinking electrodischarge machine, wire cut electrodischarge machine, laser processing machine, or other machine tool or press machine, NC turret punch press, press brake, or other forging machine, electric powered injection molding machine, etc.

The robot 3 is not particularly limited, but for example is a vertical multi-articulated robot having six axes such as illustrated. The robot 3 is configured to be able to respond to a control command from the robot controller 4. The tool center point (TCP) of the robot 3 is configured to be reachable to the predetermined position with the predetermined attitude.

The robot controller 4 is connected via a known communication network to the machine 2. The robot controller 4 is a digital computer including a CPU for running various processing operations, a memory storing control programs and parameters of the robot 3 or other information, and an interface used for connecting with external devices.

The communication network 6 used in one embodiment is a communication network used for M2M etc. and may be wired or wireless. The communication network 6 preferably secures real time communication. The communication network 6 may also for example be communication of a field network or communication of a servo control network if including communication specifications enabling transfer of general data.

The GUI screen 51 of the display device 5 is for example a touch panel, liquid crystal display (LCD) monitor, electronic paper, a CRT, or other flat shaped monitor. A 3D monitor enabling three-dimensional viewing using special glasses or a 3D holographic apparatus can be used in the case of the display elements of both the machine 2 and the robot 3 meeting the specifications for automatic generation of UI (user interfaces) based on a common model.

Figure 2:
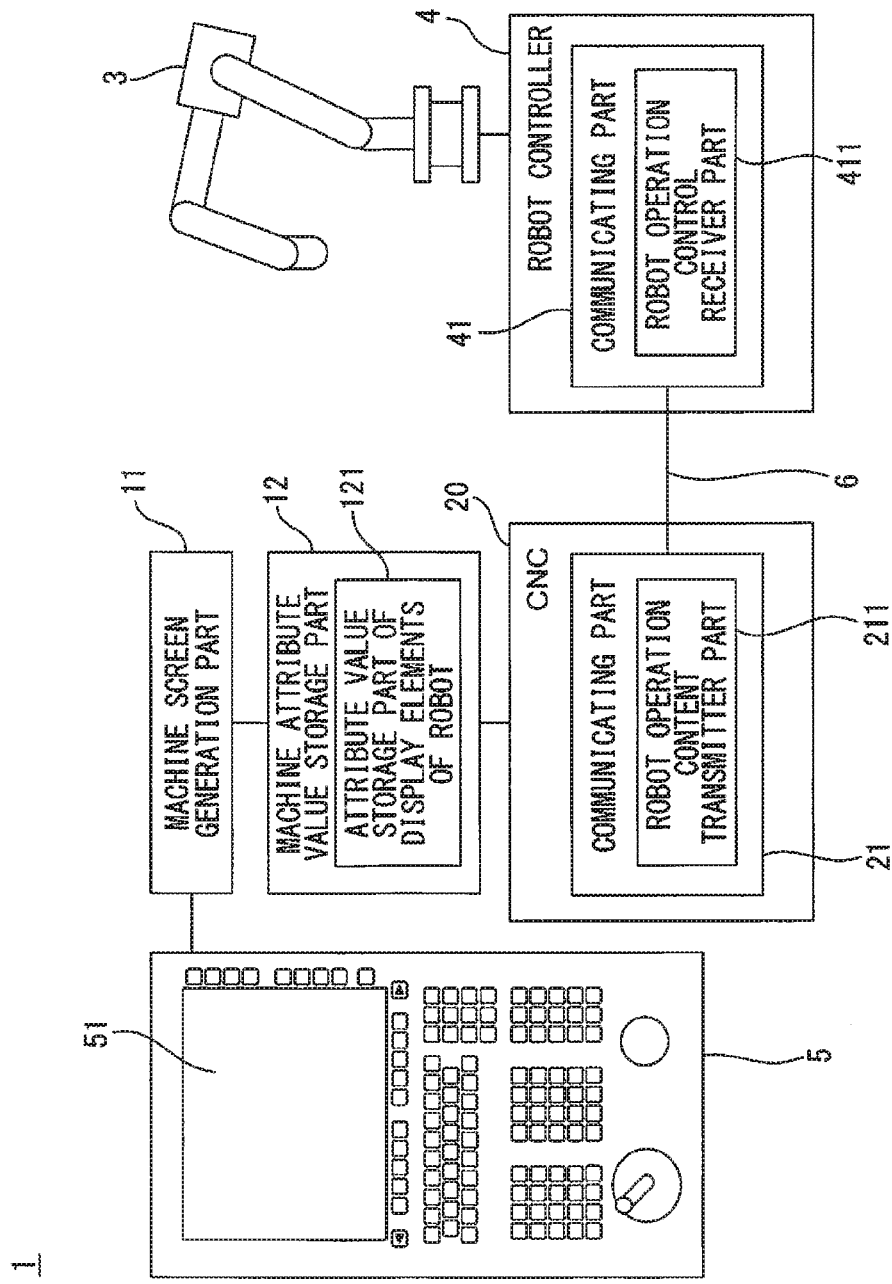
FIG. 2 is a functional block diagram of a robot system according to a first embodiment.

FIG. 2 is a functional block diagram of the robot system 1. The robot system 1 includes a machine screen generation part 11 and a machine attribute value storage part 12.

The machine screen generation part 11 is configured based on model-based UI automatic generation specifications based on definitions and attribute values. The machine screen generation part 11 analyzes the definitions and values of the attributes to define a model to thereby enable reverse engineering. For the principles of modeling, for example, see "The CAMELEON Reference Framework", September 2002 4.2.2.3. "Multi-Targeting by Reverse Engineering", 4.3.1. "Run-Time Adaptation: a Three-Step Process" or "Model-Based UI XG Final Report", May 2010.

The machine screen generation part 11 can switch UIs without programming. One embodiment alludes to both (1) the case where all of the matters relating to the confirmation of status and operation of the machine 2 in the GUI screen of the machine 2 and all of the matters relating to the confirmation of status and operation of the robot 3 are generated as a combination of attribute values in accordance with the definitions of attributes of the same specifications and (2) the case where the matters relating to the confirmation of status and operation of the machine are not limited to the method based on the definitions of attributes and attribute values and just the matters relating to the confirmation of status and operation of the robot 3 support the model-based specifications for automatic generation of UIs.

The display elements displayed on the GUI screen 51 are visible and distinct objects and are enabling to be classified by names on the GUI screen 51 so that the GUI designer ordinarily uses them when investigating the GUI screen 51. These display elements are not limited, but may include icons, labels, text boxes, menus, image display regions (images), lists, grids, check boxes, select buttons, grouping regions, pie graphs, bar graphs, line graphs, gauges, scroll bars, etc.

The "attribute of the appearance of a display element" used in this Description is a feature relating to the shape. For example, it may include a rectangular shape, triangular shape, hexagonal shape, circle, true circle, or other shape, size, position, effective boundary determined by the shape, size, and position, area surrounded by a boundary comprised of a straight line connected at a connecting point with another straight line at an angle, "an angular circle" obtained by defining arcs at the connecting points of straight lines with other straight lines, etc. The attribute of appearance may also include a shading effect, presence of accompanying text, type of language of text, type and size of font, and display position.

When the display element is a grid, the attribute of appearance may include a definition of the matrix, the presence of any title of the rows or title of the columns, and the types of the display elements in the cells (text, check boxes, image display regions, etc.)

The "feasible actions and feedbacks of a display element" used in this Description includes a prescription and limitation of user feasible actions of each element and types of response feedbacks from each actions (animation, changing color, flashing effect). Whether the worker feels that the GUI of the robot 3 fits that of the machine 2 has to do with whether the response feedbacks of the GUI screen 51 has same specifications. For this reason, the attribute specifications defining display elements of the robot 3 in the present invention may also include attributes defining the feedbacks of the GUI screen 51.

The "grouping region" used in this Description corresponds to a "region of the GUI screen 51 separated by at least utility or purpose". For example, a grouping region is a box model defined by the CSS3 standard or a frame defined by the HTML standard. In the HTML, a window is divided into rectangular region units and the display elements are grouped accordingly. However, in the GUI screen 51 of a machine 2 using CNC, outside of rectangular shapes, hexagonal shapes, true circles, ellipses, or other general geometric shapes may be used for grouping the display elements.

In an actual GUI screen where display elements are grouped by geometric shapes not rectangular shapes, to prevent misunderstanding of the worker on the GUI screen, designed results of GUI designers often can be interpreted as having applied the Gestalt principles of visual perception. Recently, making liberal use of general geometric shapes (hexagonal shapes, true circles, ellipses, etc.) in design has not been uncommon. For this reason, in one embodiment, the region where the display elements are grouped will not be called a frame or box, but will be named a "grouping region".

The machine attribute value storage part 12 stores machine attribute values. Further, the machine attribute value storage part 12 includes an attribute value storage part 121 of the display elements of the robot 3.

As shown in FIG. 2, the CNC of the machine 2 includes a communicating part 21 equipped with a robot operation content transmitter part 211. Further, the robot controller 4 includes a communicating part 41 equipped with a robot operation content receiver part 411. Due to this, the operation content of the robot 3 is sent and received between the CNC 20 and the robot controller 4.

Figure 3:
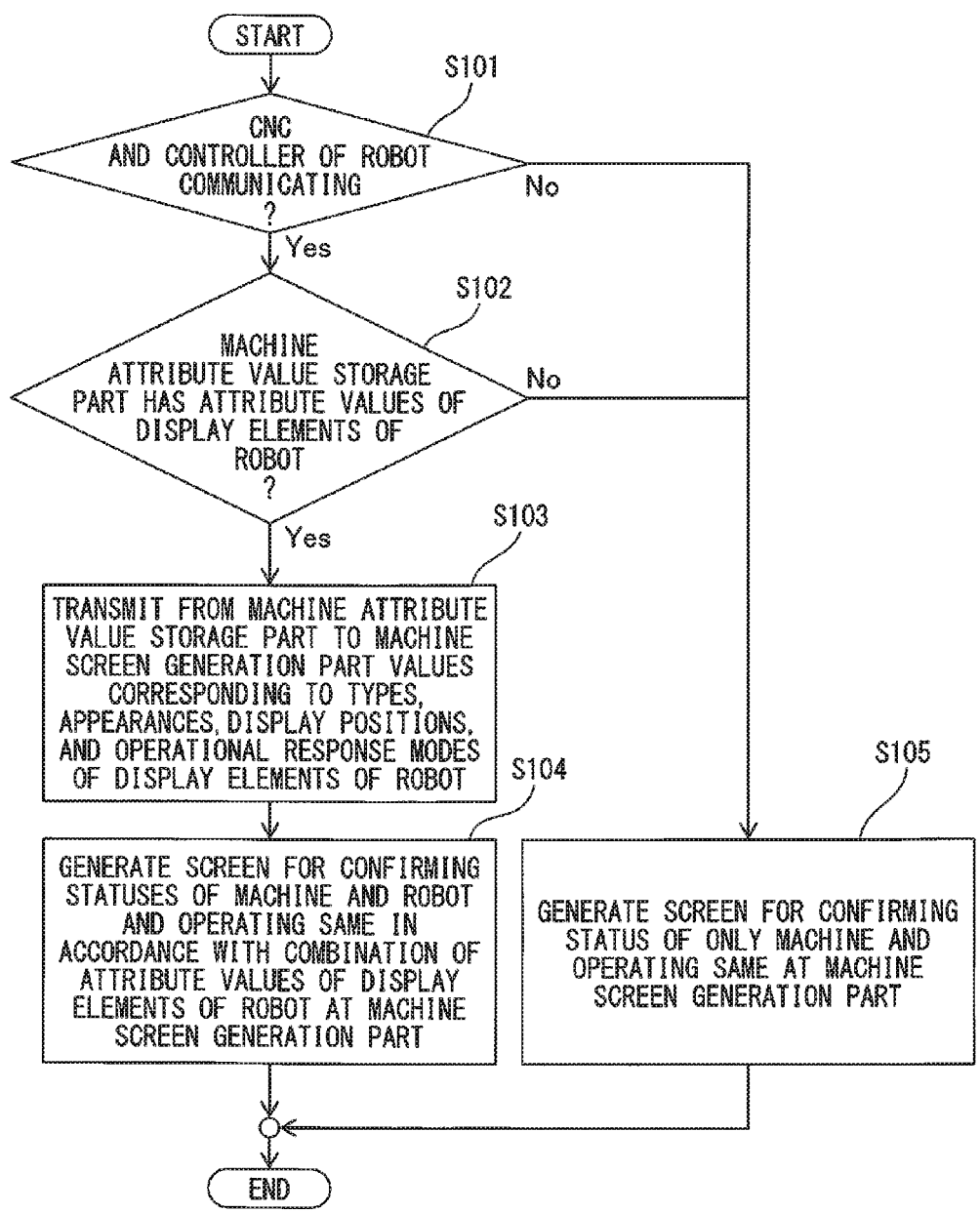
FIG. 3 is a flow chart showing processing executed in accordance with the first embodiment.

Referring to FIG. 3, the processing executed by the robot system 1 according to one embodiment will be explained. First, at step S101, it is determined if the CNC 20 and the robot controller 4 are communicating with each other.

When the CNC 20 and the robot controller 4 are communicating, the routine proceeds to step S102. At step S102, it is determined if the machine attribute value storage part 12 has stored attribute values of the display elements of the robot 3.

When the result of determination at step S102 is affirmative, the routine proceeds to step S103 where the machine attribute value storage part 12 transmits the attribute values corresponding to the types, appearances, display positions, and definitions of both feasible operations and responses relating to the robot 3 to the machine screen generation part 11.

At step S104, the machine screen generation part 11 adds the display elements of the robot 3 to generate the GUI screen 51 in accordance with the combination of attribute values of the display elements of the robot 3. The GUI screen 51 originally includes information for confirmation of status and operation of the machine 2. Here, in addition to this, the machine screen generation part 11 adds display elements of the robot 3 with common appearances and definitions of both feasible operations and responses at the inside of each grouping region of the GUI screen 51 of the machine 2. Therefore, the worker of the machine 2 can operate the robot 3 from the GUI screen 51 of the machine 2.

When the CNC 20 and the robot controller 4 are not communicating (when the result of determination at step S101 is negative) or when the attribute values relating to the display elements of the robot 3 are not stored (when the result of determination at step S102 is negative), the routine proceeds to step S105 where the machine screen generation part 11 generates a screen for confirmation of status and operation of just the machine 2. That is, the display elements of the robot 3 are excluded from the GUI screen 51.

The display elements of the robot 3 are not just added restricted to rectangular regions of partial sections of the GUI screen 51 of the display device 5. For example, the display region relating to the navigation of the machine 2 may have navigation added to it for switching to a screen for confirmation of status or operation of the robot 3 by display elements of equivalent appearances and definitions of both feasible operations and responses.

Figure 4:
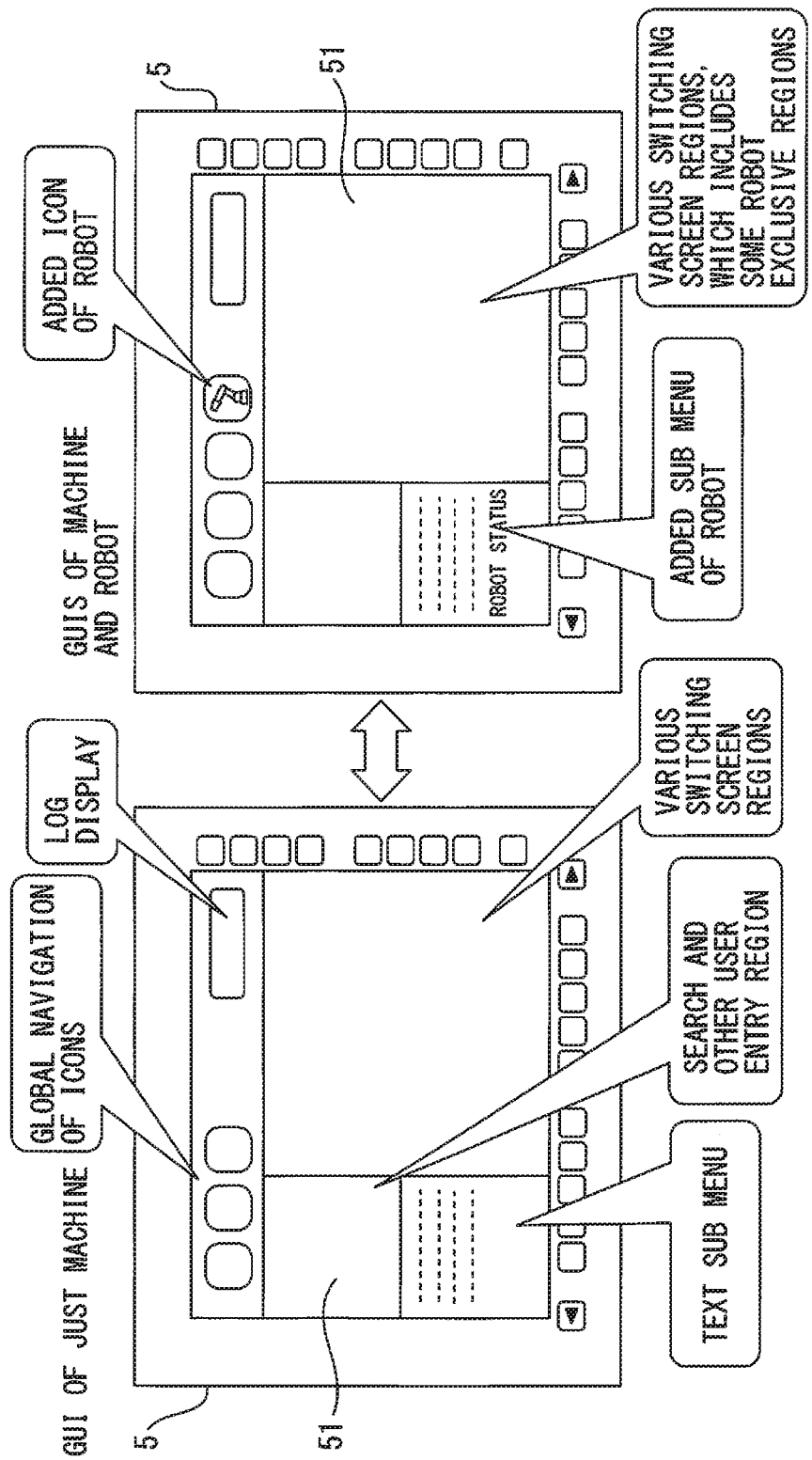
FIG. 4 is a view showing a first example of a GUI screen.

FIG. 4 shows a first example of a GUI screen 51. The left side of FIG. 4 shows a GUI screen 51 including only display elements of the machine 2, while the right side shows a GUI screen 51 including display elements of the machine 2 and display elements of the robot 3.

At the various switching screen regions of the GUI screen 51 of the display, when the CNC 20 is not communicating with the robot 3, the various settings and the management screen etc. of the machine 2 are displayed. If communication with the robot 3 is started, the various switching screen regions are allocated as regions for confirmation of status or operation of the robot 3.

In the region of global navigation of the icons of the machine 2, an icon is added for opening a screen for confirmation of status and operation of the robot 3. Further, in the text sub menu region as well, a text sub menu is added for opening other screens of the robot 3.

Figure 5:
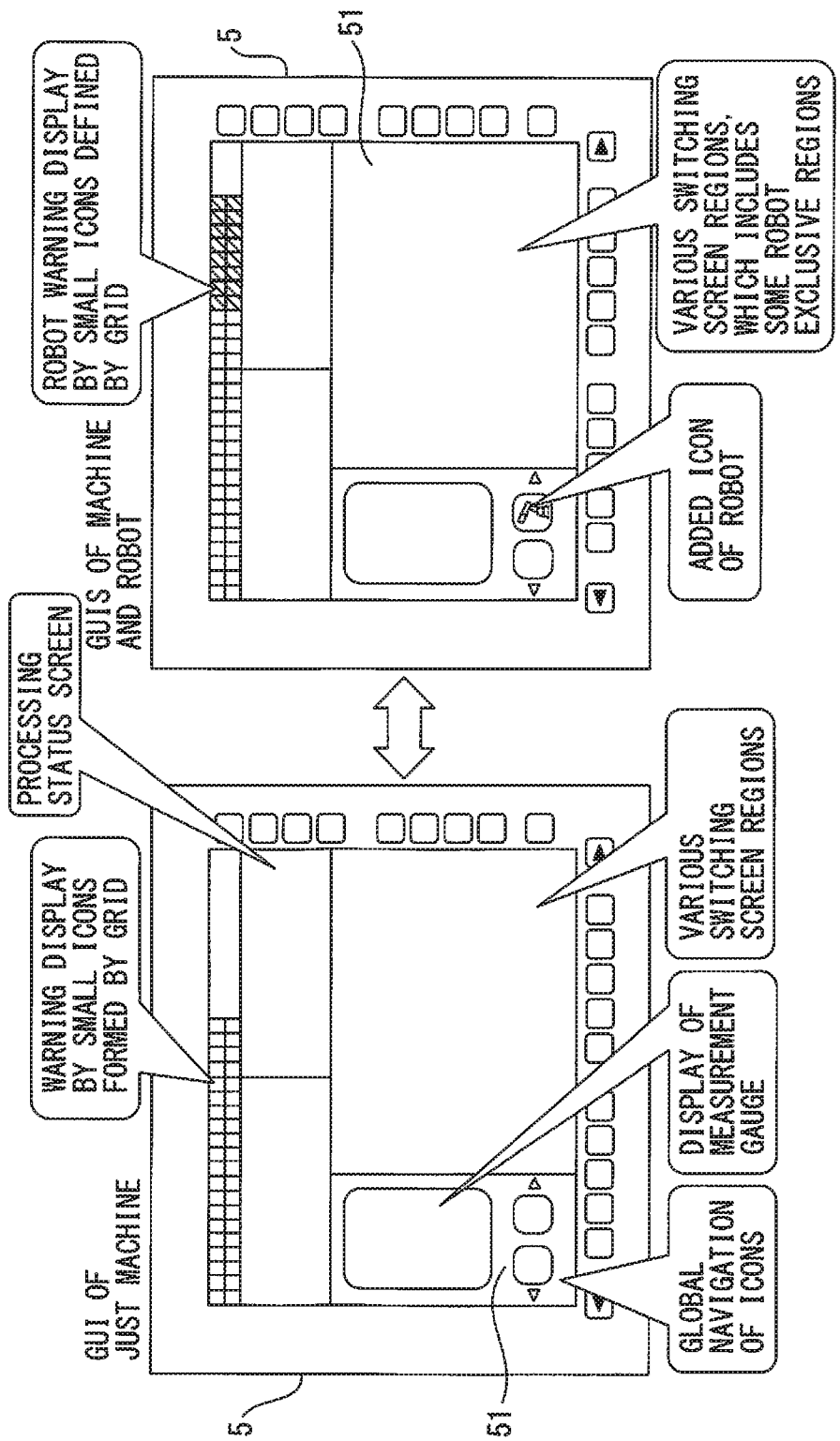
FIG. 5 is a view showing a second example of a GUI screen.

FIG. 5 shows a second example of a GUI screen 51. In the same way as FIG. 4, the left side of FIG. 5 shows a GUI screen 51 including only display elements of the machine 2, while the right side shows a GUI screen 51 including display elements of the machine 2 and display elements of the robot 3.

At the GUI screen 51 of the machine 2, in the icon global navigation region, if touching and sliding a triangle-shaped symbol showing sliding, it is possible to switch the icon displayed. The icon of the robot 3 is added to the global navigation icon list. Further, at the top part, there is a status display region using small icons formed by division of the region by a grid. When there is leeway in that region, it is also possible to display a warning of the robot 3 by the same appearance.

Figure 6:
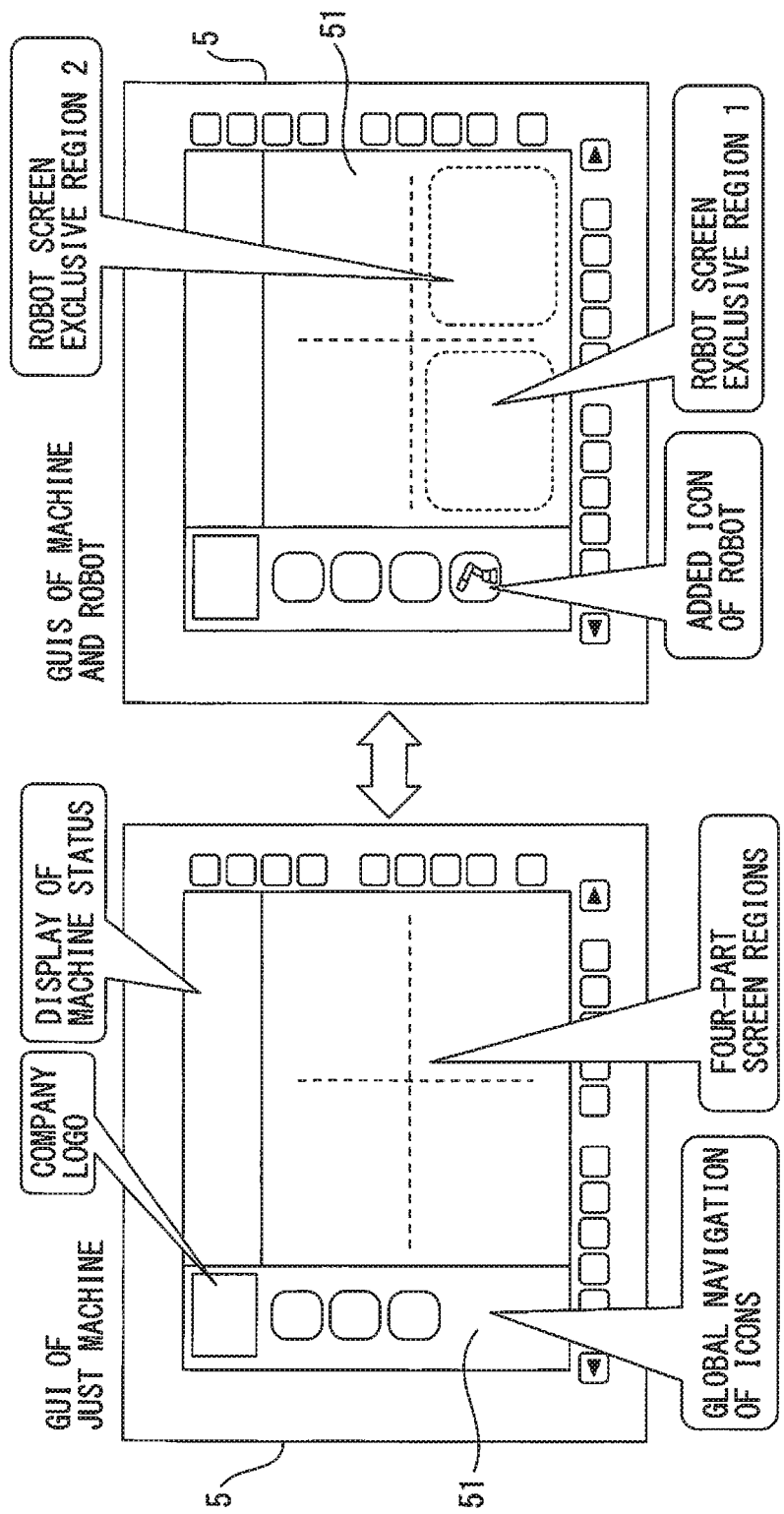
FIG. 6 is a view showing a third example of a GUI screen.

FIG. 6 shows a third example of a GUI screen 51. In the same way as above, the left side of FIG. 6 shows a GUI screen 51 including only display elements of the machine 2, while the right side shows a GUI screen 51 including display elements of the machine 2 and display elements of the robot 3.

At the GUI screen 51 of the machine 2, there is a global navigation display region including icons. An icon of the robot 3 is added there. As shown in FIG. 6, in the case of a mode where the multipurpose screen of the machine 2 can be divided into four regions, for example, two regions among them may be allocated as screens for confirmation of status and operation of the robot 3.

According to the robot system 1 according to the present embodiment, the following advantages are obtained.

The machine manufacturer designing the GUI 51 to be displayed on the display device 5 of the machine 2 using the CNC 20 sets the display elements of the robot 3 to be communicated and connected with in accordance with the definitions of the attribute values and stores them in advance in the attribute value storage part 121 of the display elements of the robot 3. Here, the display elements of the robot 3 are set so as to become equal to the display elements of the machine 2 in appearance and definitions of both feasible operations and responses. Due to this, when communicating with the robot 3, the GUI for confirmation of status and operation of the robot 3 can be displayed on the GUI screen 51 of the machine 2.

As a result, the worker becomes able to operate the robot 3 in the same way as the machine 2 regardless of the manufacturer or model of the machine 2. Due to this, even if the worker is not well versed in the robot 3 and, further, even if the worker has not read the instruction manual of the robot 3, the worker can acquire the information required for confirming the status of the robot 3 from the information displayed at the display device 5 of the machine 2.

Even at the present time where utilization of operations on a GUI screen has become common place when handling industrial equipment, the actual methods of use differ depending on the equipment. According to the present embodiment, a worker becomes able to deduce information relating to the robot just by looking at the GUI screen of the machine using CNC. As a result, the time required for learning operation of the robot is shortened. In the present system, the robot controller can identify the manufacturer and model of the machine using CNC by transfer of data over the communication network 6. Therefore, if holding in advance a plurality of combinations of attribute values corresponding to machines using CNCs of different manufacturers in the attribute value storage part 121 of the display elements of the robot of the machine attribute value storage part 12, even if the robot is connected to a different machine from the current machine 2, so long as a combination of attribute values corresponding to that different machine is held, it is possible to suitably add display elements for operation and confirmation of status of the robot corresponding to the design of the GUI screen of the different machine.

If the communication between the CNC and the robot controller is cut, the GUI of the robot is not displayed on the display of the machine. Therefore, the worker can determine whether linkup with the robot is possible from the GUI screen of the machine. If the display elements of the robot disappear after the display elements of the robot are once normally added to the GUI screen of the machine, the worker can deduce that communication with the robot has been cut for some reason or another. With this system, the worker can get a feeling similar the "plug-and-play" UX (User Experience), so mastering it becomes faster.

Whether usage actually becomes easier or not can be investigated by asking a robot operation worker of the poor skill to participate in the test on switched screens by various methods generally known as usability tests (or measurement of UX metrics (User Experience Metrics)). Alternatively, the method may be utilized of conducting a test while using the recorded information of operation of the worker disclosed in Japanese Patent Publication No. 2010-102465A as a basis to estimate the degree of the skill by a prepared formula.

Figure 7:
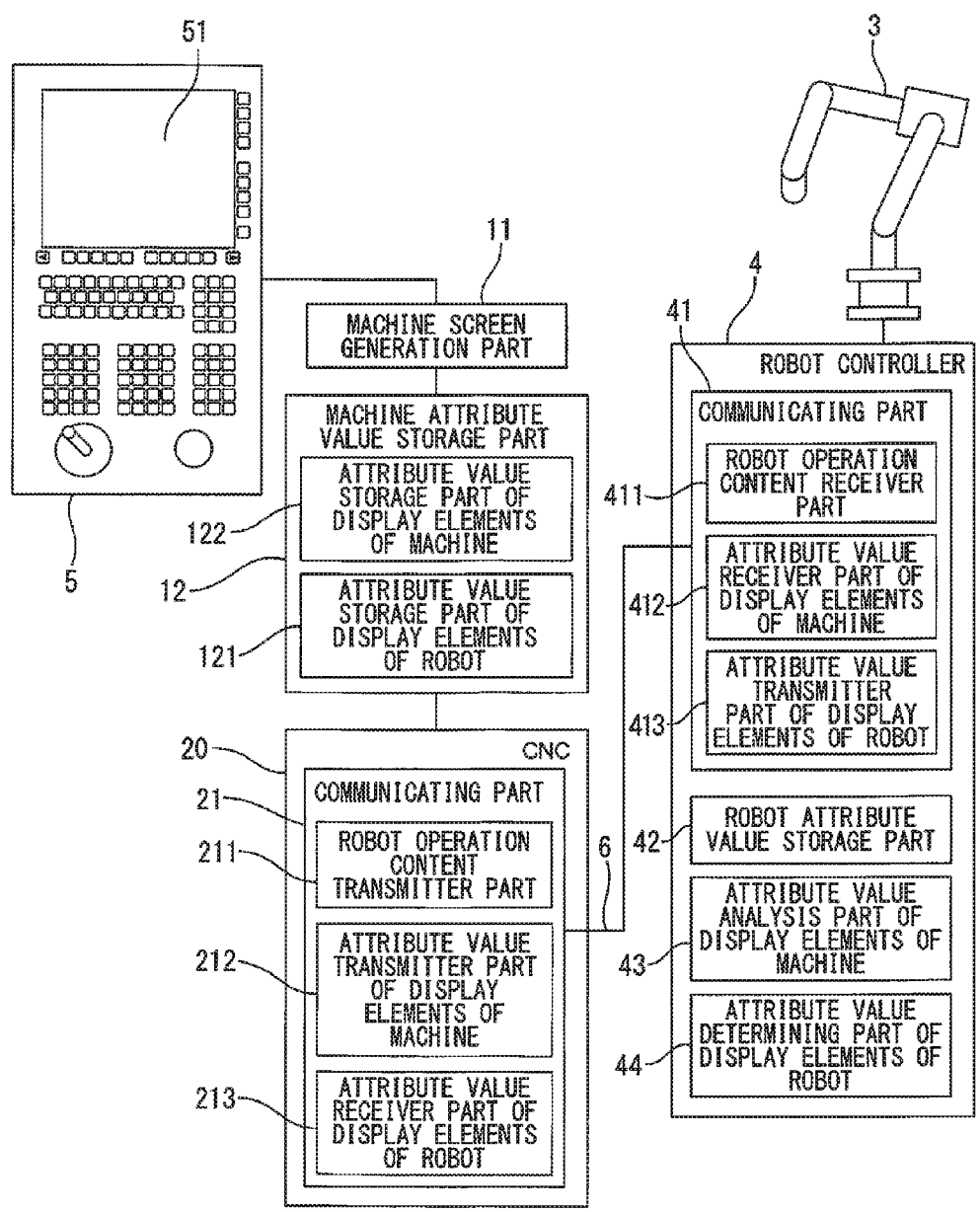
FIG. 7 is a functional block diagram of a robot system according to a second embodiment.

FIG. 7 is a functional block of a robot system 1 according to a first embodiment. In one embodiment, the machine attribute value storage part 12 includes a machine attribute value storage part 122 storing attribute values of display elements of the machine 2 and a robot attribute value storage part 121 storing attribute values of display elements of the robot 3.

The communicating part 21 of the CNC 20 includes a robot operation content transmitter part 211, an attribute value transmitter part 212 transmitting attribute values of the display elements of the machine 2, and an attribute value receiver part 213 receiving attribute values of display elements of the robot 3.

The communicating part 41 of the robot controller 4 includes a robot operation content receiver part 411, an attribute value receiver part 412 receiving attribute values of the display elements of the machine 2, an attribute value transmitter part 413 transmitting attribute values of display elements of the robot 3, a robot attribute value storage part 42, an attribute value analysis part 43 for analyzing the attribute values of the display elements of the machine 2, and an attribute value determining part 44 for determining attribute values of display elements of the robot 3.

In one embodiment, the attribute value storage part 122 of the machine attribute value storage part 12 is used to store the attribute values for confirmation of status and operation of the machine 2. As opposed to this, the machine attribute value storage part 12 does not store attribute values for confirmation of status and operation of the robot 3. The attribute values for generating screen information for confirmation of status and operation of the robot 3 are stored in the robot attribute value storage part 42 of the robot controller 4.

Figure 8:
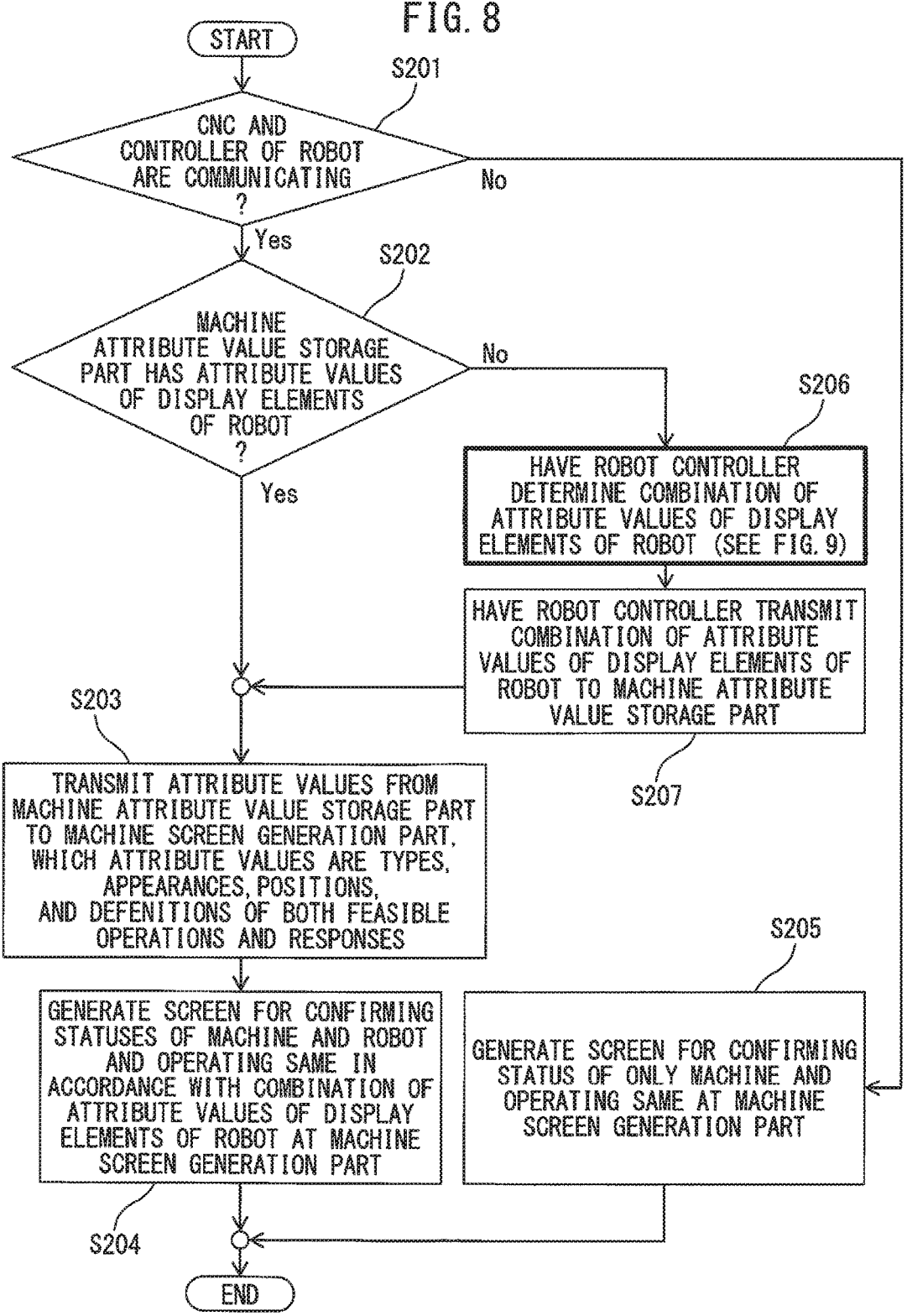
FIG. 8 is a flow chart showing the processing executed in accordance with the second embodiment.

Referring to FIG. 8, the processing executed in the robot system 1 according to the present embodiment will be explained. The processing at steps S201 to S205 is the same as the processing of steps S101 to S105 explained with reference to FIG. 3. However, in the present embodiment, if the result of determination at step S202 is negative, the processing of steps S206 and S207 is executed.

At step S206, the robot controller 4 determines the combination of attribute values of display elements of the robot 3. Details of the processing at step S206 will be explained later. At step S207, the robot controller 4 transmits the combination of attribute values of the display elements of the robot 3 to the machine attribute value storage part 12.

Figure 9:
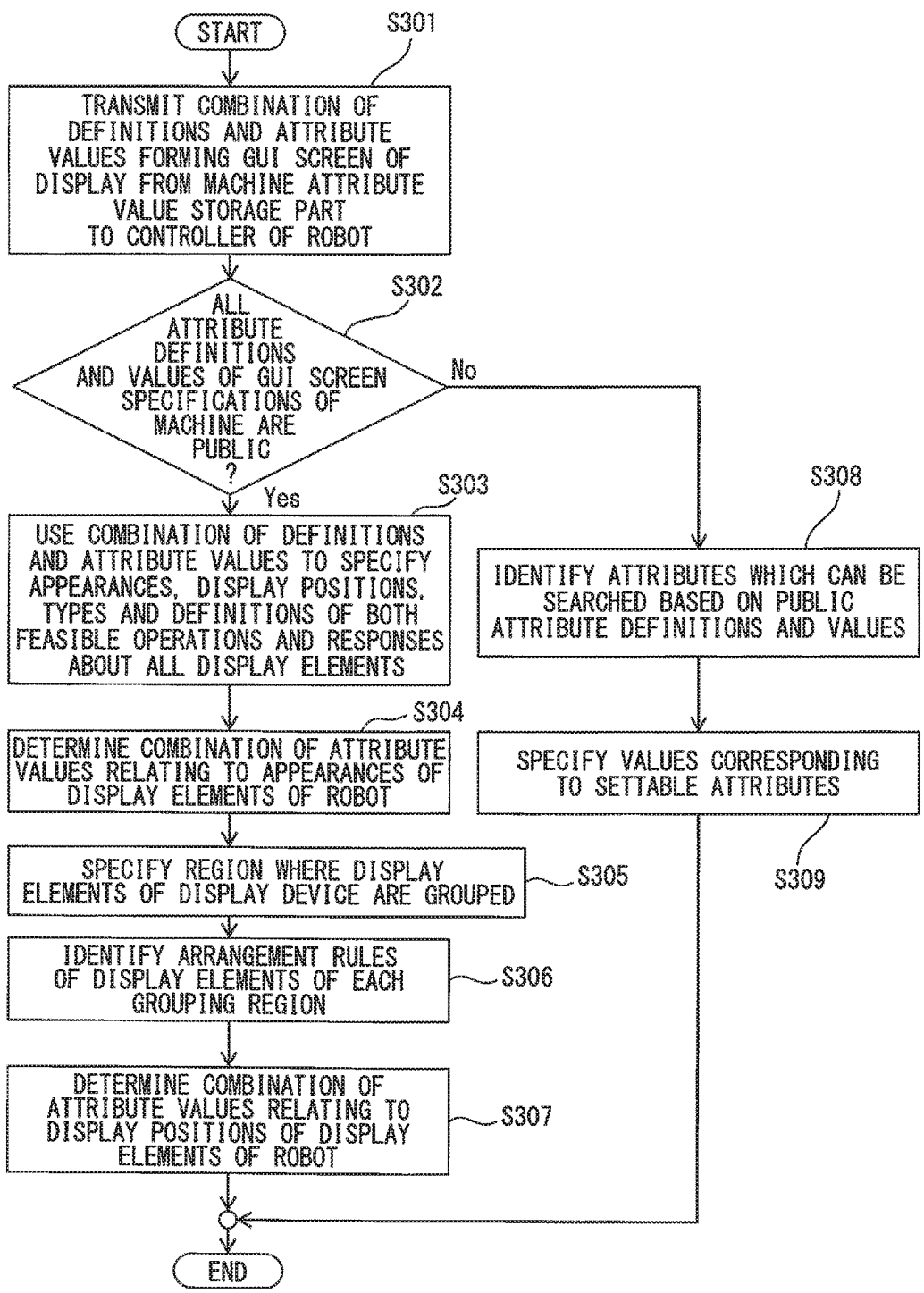
FIG. 9 is a flow chart showing the processing of step S206 of FIG. 8.

Next, referring to FIG. 9, the processing at step S206 of FIG. 8 will be explained. The machine attribute value storage part 12 stores a combination of both the attribute definitions and the attribute values about the display elements of the machine 2. This information can only be read out and cannot be changed. Therefore, this information is transmitted to the robot controller 4 and analyzed by the robot controller 4.

At step S301, the combination of the definitions of attributes and attribute values forming the GUI screen 51 of the display device 5 is transmitted from the machine attribute value storage part 12 to the robot controller 4.

At step S302, it is determined if all of the definitions of attributes and attribute values of the mode of the GUI screen of the machine 2 have been made public. That is, it is determined if the combination of all of the types, appearances, display positions, definitions of both feasible operations and responses or other attribute values of the display elements of the machine 2 has been made public.

If the combination of all of the definitions of attributes and attribute values has been made public (when result of determination at step S302 is affirmative), the routine proceeds to step S303 where the appearances, display positions, types, and definitions of both feasible operations and responses of the display device are identified from the combination of both the attribute definitions attribute values.

At step S304, a search is run through the icon menu or text menu corresponding to global navigation of operation of the machine 2. The combination of attributes and values of the display elements of the robot 3 is determined so as to add an icon or menu for navigation for confirmation of status and operation of the robot 3 in the form discovered as the result of the search.

At step S305, all of the relationships between the grouping regions of the machine 2 and screen transition are searched through to identify them. At step S306, the arrangement rules of the display elements of each grouping region is identified.

At step S307, the combination of the definitions of attributes and attribute values of the display elements of the robot 3 is determined so as to re-arrange the array of display elements which had been prepared in advance at the various screens for robot 3 use in accordance with the identified arrangement rules. The algorithm for determination of the layout will be explained later.

On the other hand, when at step S302 the combination of all of the definitions of attributes and attribute values has not been made public (when the result of determination is negative), that is, when only the combination of attribute values of the display elements of the machine 2 for determining the minimum extent of attributes and attribute values required for adding the display elements of the robot 3 has been made public, the routine proceeds to step S308. At step S308, since the potentially added grouping regions and types of display elements are limited by the attributes made public, the definitions of attributes and attribute values which can be changed and added are identified by a search.

At step S309, from what is found as results of the search, the grouping regions of the machine corresponding to the global navigation and menus are identified and values are specified to add the required display elements of the robot.

Next, the size and position of a region where the display elements of the robot 3 can be freely added are identified. Regarding the arrangement rules of the display elements, this is followed for only the modes made public. For the remainder, the existing values are left as they are to thereby complete the layout processing. The changed combination of the attribute values of the display elements of the robot 3 is stored from the robot controller 4 to the machine attribute value storage part 12. Utilizing the result, the machine screen generation part 11 is used to update the GUI screen 51 of the display device 5.

When switching from the screen for handling the machine 2 to the screen for handling the robot 3, to prevent the worker from causing a capture slip or mode error slip of human error (see "The Design of Everyday Things Revised and Expanded Edition", Donald A Norman, in Japanese published by Shin-Yo-Sha, Chapter 4. Know What to Do— Limitations, Findability, and Feedback, Chapter 5. Human Error? No. Poor Design), it is desirable that the regions viewed and the regions operated match the regions when handling the machine 2 and can be naturally deduced from the regions when handling the machine 2.

For this purpose, the various display elements of the robot 3 are arranged so as to be close to similar types at the GUI screen 51 of the display device 5. Next, an example of designation of the layout will be given, but, within a range not inducing human error, it is also possible to define another rule for determination of the layout so as to generate the layout.

Figure 10:
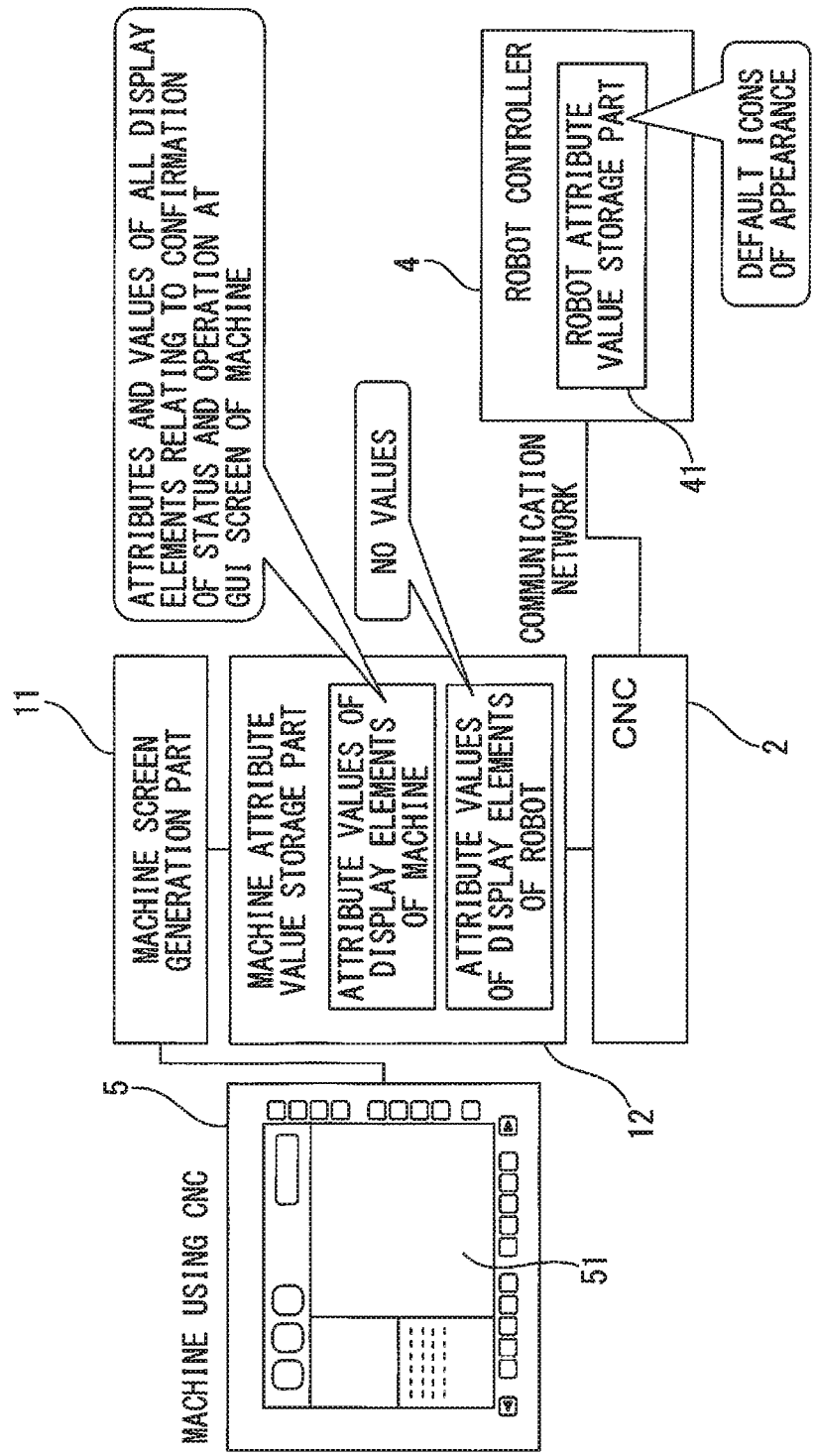
FIG. 10 is a view showing a mode of addition of an icon.
Figure 11:
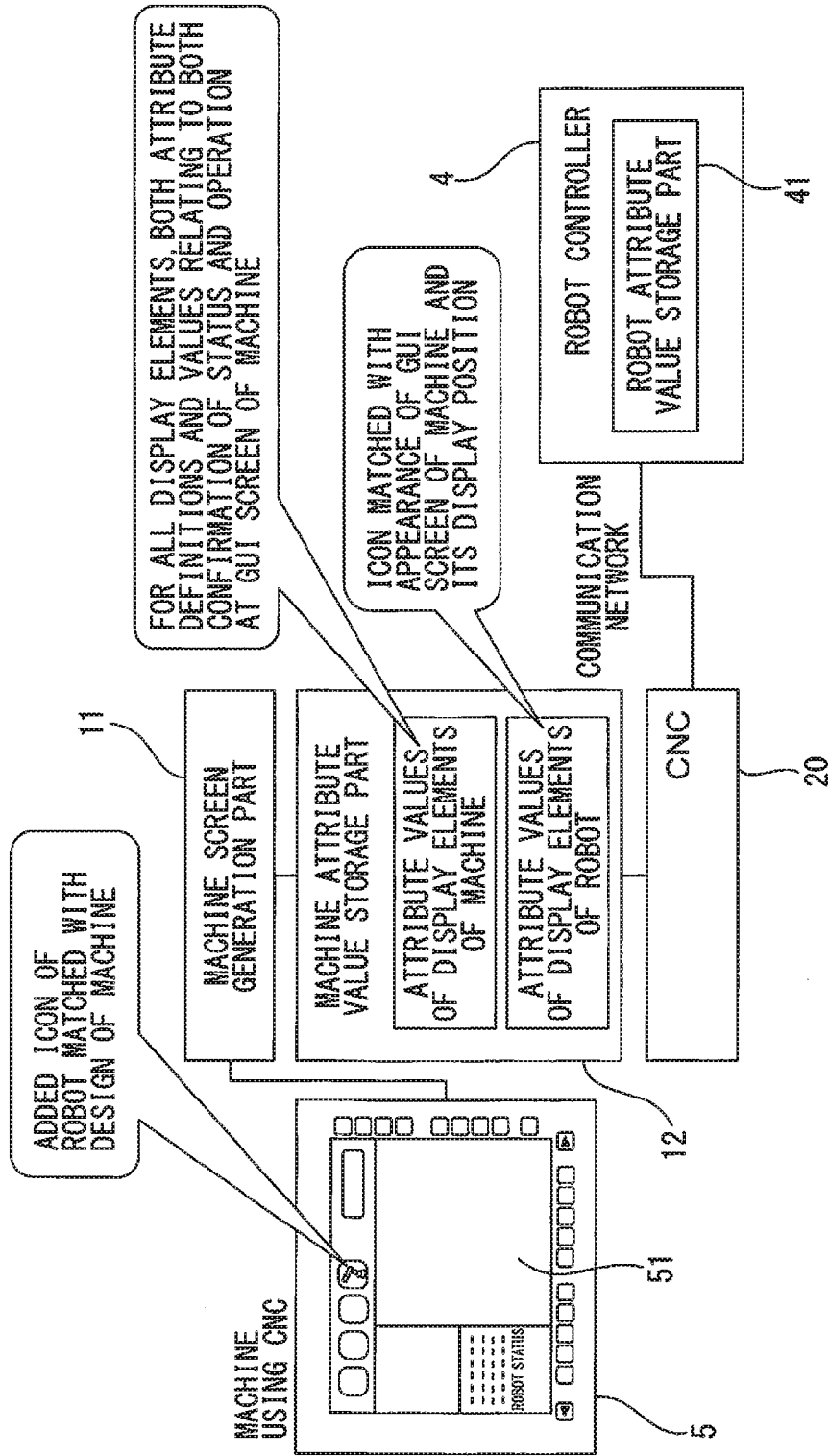
FIG. 11 is a view showing a mode of addition of an icon.

Referring to FIG. 10 and FIG. 11, the processing for addition of icons will be explained. The machine attribute value storage part 12 stores definitions of attributes and attribute values for confirmation of status and operation of the machine 2. However, it does not store definitions of attributes and attribute values for confirmation of status and operation of the robot 3.

Figure 12:
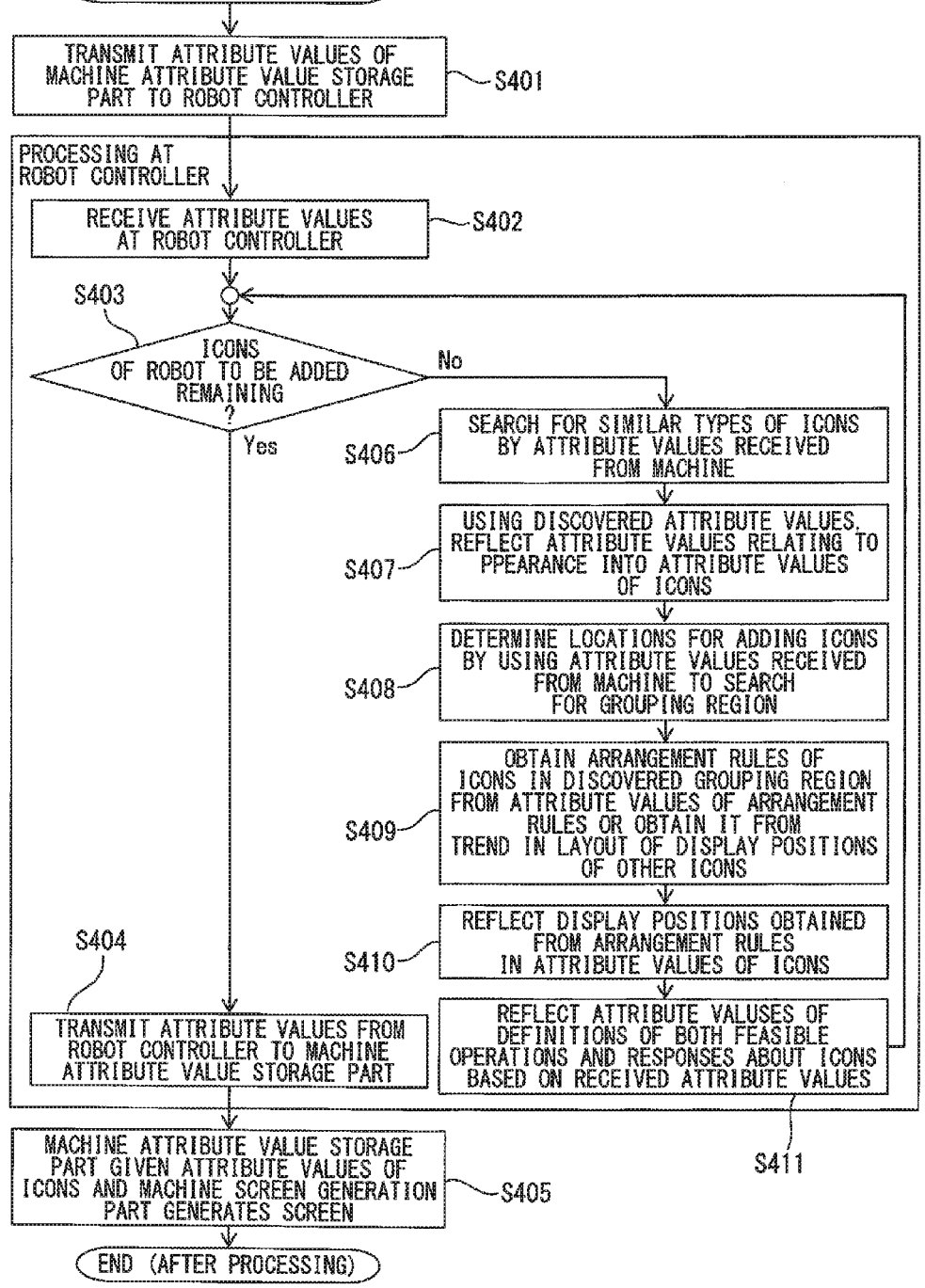
FIG. 12 is a flow chart showing the processing for adding an icon.

On the other hand, the robot attribute value storage part 42 of the robot controller 4 stores definitions of attributes and definition values of existing GUIs for confirmation of status and operation of the robot 3 to be added to the GUI screen 51 of the machine 2. If referring to FIG. 11, the GUI screen 51 of the display device 5 displays an icon of the robot added so as to be consistent with the design of the machine 2. The icon is added in accordance with steps S401 to S411 shown in FIG. 12.

According to the robot system 1 according to the present embodiment, the combination of definitions of attributes and definition values relating to the generation at the machine screen generation part 11 is reverse engineered so as to automate the analysis of the screen for making the display elements of the robot 3 consistent with the machine 2. Due to this, it is possible to automate the processing to add display elements of the robot 3.

Therefore, the manufacturer of the machine 2 does not have to specify a combination of the different values corresponding to each manufacturer or each model of a robot 3 in the machine attribute value storage part 12 before the machine 2 is started on the sale. This robot system 1 automates the processing, so the design costs of the GUI screen can be cut. Further, even if connecting the robot 3 to a machine different from the machine 2, so long as that different machine has a similar configuration to the machine 2, the display elements for operation and confirmation of status of the robot 3 for the different machine are automatically determined. Further when returning the robot 3 to connection with the machine 2, there is already a suitable combination of the attribute values of the display elements of the robot in the attribute value storage part 121 of the display elements of the robot of the machine attribute value storage part 12. The display elements of the robot are smoothly added to the GUI screen of the machine. A machine newly connected to the robot 3, each time connected, causes the GUI screen of the machine to be analyzed by the robot 3 and automatic determination of the mode for addition of suitable display elements to the robot 3. By doing this, if the machines of a plurality of manufacturers have similar configurations as the machine 2 of the present embodiment, the GUI screens of this plurality of manufacturers do not have to be analyzed by human designers. The robot 3 can suitably determine the mode for addition of display elements for operation and confirmation of status of the robot 3.

Figure 13:
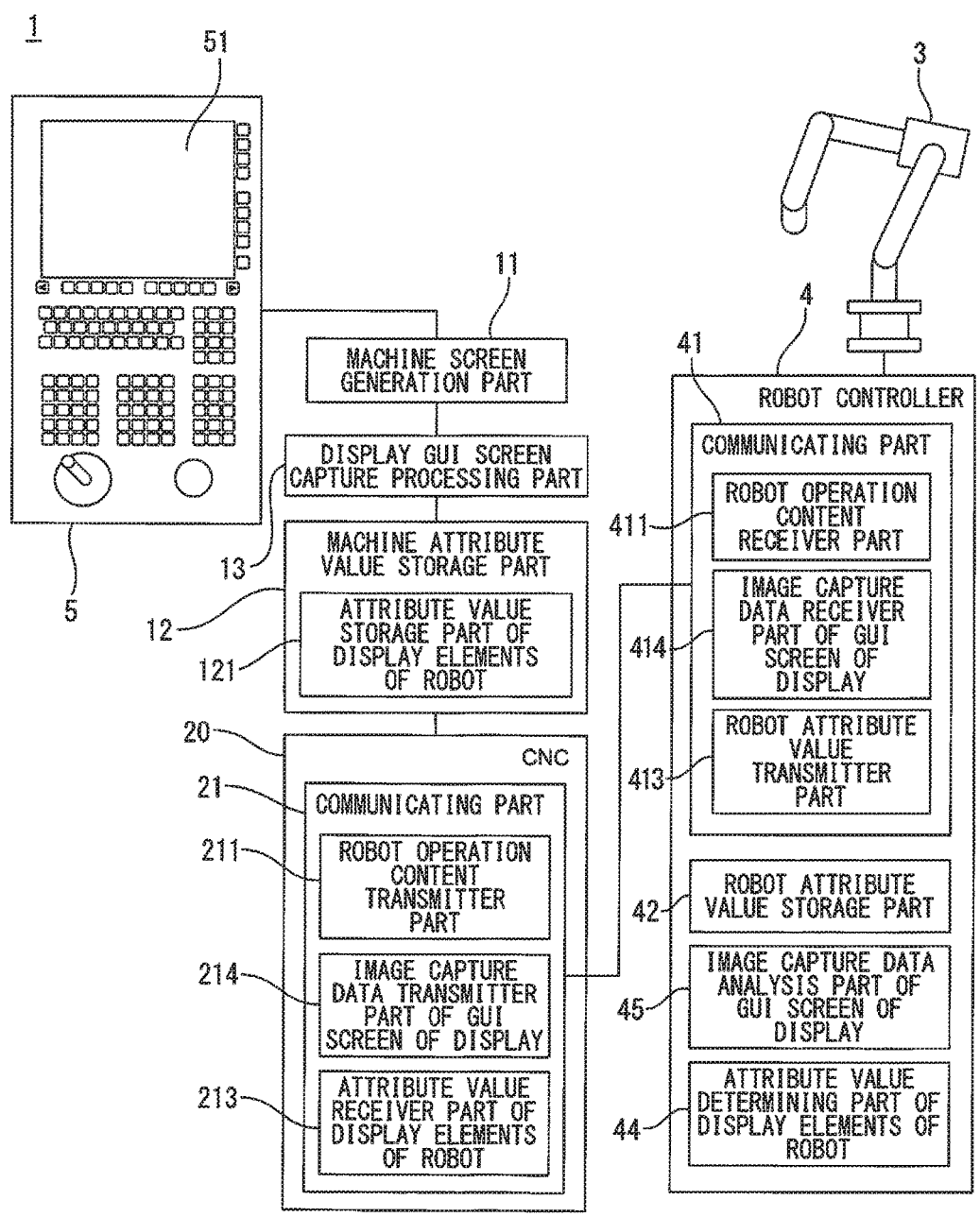
FIG. 13 is a functional block diagram of a robot system according to a third embodiment.

FIG. 13 is a functional block diagram of a robot system 1 according to a third embodiment. According to the present embodiment, instead of the attribute values for generating a screen for confirmation of status and operation of the machine 2, the robot controller 4 analyzes screen capture data of the GUI screen 51 of the display device 5. The present embodiment is particularly effective when the attribute values relating to the machine 2 cannot be read from the machine attribute value storage part 12.

According to the present embodiment, the robot system 1 further includes a display device GUI screen capture processing part 13. Further, the CNC 20 further includes an image capture data transmitter part 214 of the GUI screen 51 of the display device 5. The robot controller 4 further includes an image capture data receiver part 414 of the GUI screen 51 of the display device 5 and an image capture data analysis part 45 of the GUI screen 51 of the display device 5.

Figure 14:
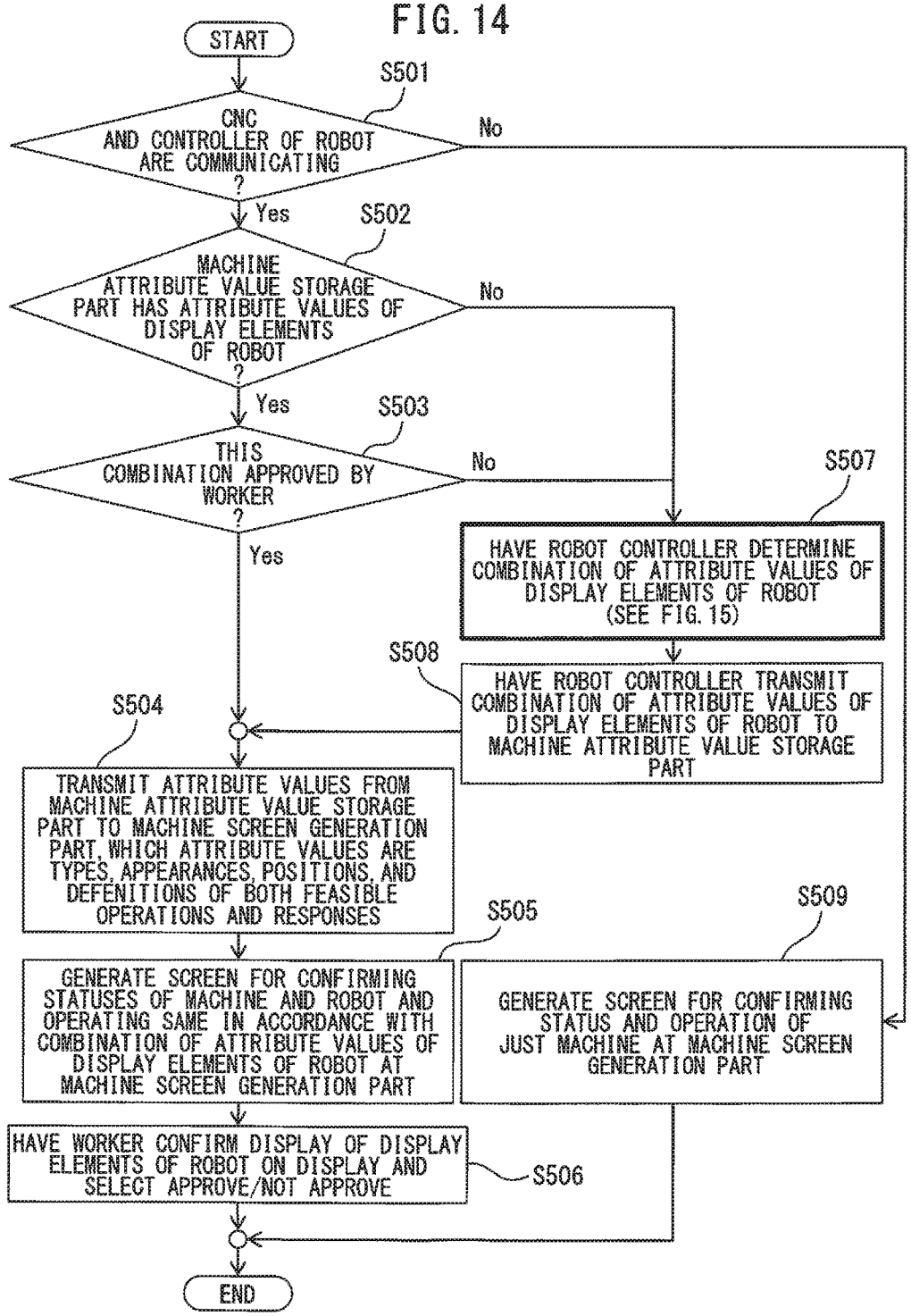
FIG. 14 is a flow chart showing the processing executed in accordance with the third embodiment.
Figure 15:
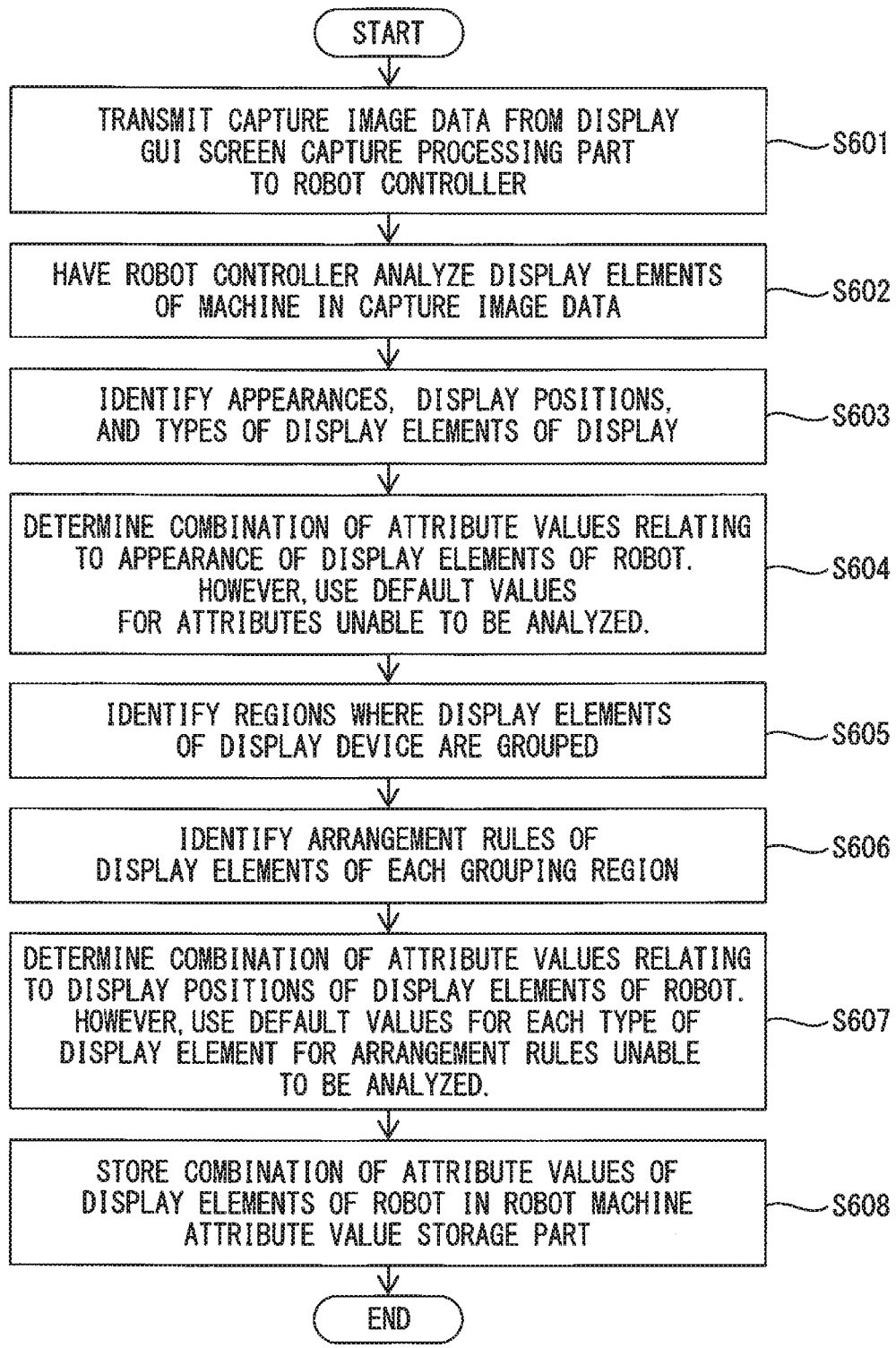
FIG. 15 is a flow chart showing the processing of step S507 of FIG. 14.

FIG. 14 is a flow chart showing the process according to the robot system 1 according to the present embodiment. The robot system 1 analyzes the screen capture data of the GUI screen 51 according to steps S501 to S509. Steps S601 to S608 shown in the flow chart of FIG. 15 show in more detail the processing at step S507.

The screen updating period is at the slowest 15 fps (frames per second) at both the machine 2 using CNC and the robot 3 and is for example 60 fps or 30 fps. If the screen updating period differs between the machine 2 and robot 3, the screen updating period of the robot 3 is preferably made the same as or smaller than the screen updating period of the machine 2.

The still image data or moving image data obtained from the GUI screen 51 of the machine 2 is used for judging the display elements of the GUI screen 51. For example, an image file similar to bit-map data which is screen captured during operation of the GUI screen 51 is used. As known file image formats, there are "bmp", "GIF", "png", "jpeg", etc.

Further, as the known method, the software "Sikuli" for automatic analysis of the screen of a computer disclosed in "Associating the Visual Representation of User Interfaces with their Internal Structures and Metadata", Oct. 15-19, 2011, UIST'11 may also be used.

The technique for analysis of the GUI screen of a PC or other workstation is known. For the algorithm for analysis of the GUI screen of a machine using CNC, one similar to the known art can be used.

The algorithm for automatic analysis of the GUI screen of a machine using CNC includes the following step 1 and step 2.

Step 1: The robot controller 4 identifies the display elements of the machine 2 from the obtained image capture data of the GUI screen 51 of the display device 5.

Step 2: Since the robot controller 4 is not able to always identify all of the attribute values, so the appearances of the different types of display elements of the machine 2 are made to reproduce the similar impression of the display elements of the robot 3. And the attribute values relating to the display positions are determined so as to reproduce the arrangement rules.

Note that, when display elements of the robot 3 are added to the GUI screen 51 of the display device 5, if the reproduction of the similar impression is insufficient, the worker can transmit repeatedly the screen capture data to the robot controller 4 to have it analyze the data. Then the added display elements approach the original machine GUI impression. For example, this step can be performed by making the GUI screen 51 of the display device 5 display a message box when the display elements of the robot 3 finish being added and by having the worker respond as to whether to approve the completion of addition of the GUI of the robot 3.

Next, the method of identification of the types of the display elements will be explained.

Unlike when analyzing a general photographic image, it is possible to analyze the image data of the GUI screen precisely by constructing an algorithm assuming the trends in design of existing GUI screens. The reason why is that in the design of the GUI screens of industrial equipment, often what the designers refer to as skeuomorphic design is applied. If quoting from "The Design of Everyday Things Revised and Expanded Edition", Donald A Norman, in Japanese published by Shin-Yo-Sha, Chapter 4. Know What to Do—Limitations, Findability, and Feedback, Chapter 5. Human Error? No. Poor Design, page 220, skeuomorphic design means "To incorporate old, familiar ideas into new technologies, even though they no longer play a functional role". "One way of overcoming the fear of the new is to make it look like the old. In fact, it has its benefits in easing the transition from the old to the new. It gives comfort and makes learning easier. Existing conceptual models need only be modified rather than replaced".

The direction of design envisioned by GUI screen designers of the machine using CNC and the robot will be explained next. The design of a GUI screen tends to resemble the GUI screen design of a specific design source with a large share in the field of PCs or work stations of data processing equipment. As the designs of GUI screens, designs for handling savings at ATMs, designs for management of power stations and other plants, designs of GUI screens for monitoring and alarm use provided by security firms, etc. are included, but designs resembling these are seldom selected.

The reason why is that whether a user of the machine using CNC or a user of a robot, they can be imagined as having been involved in such work whether by being hired or starting up a business, but they can be imagined as having had experience with use of GUI screens at home PCs or at PCs trained on in training organizations before that.

However, in the educational institutions or households of newly industrializing countries, the rate of spread of PCs is still low. In newly industrializing countries, even if trying to secure personnel for manufacturing plants, sometimes it is very difficult to find persons with experience in use of PCs. Therefore, recently, smartphones have become significant presences in the design of GUI screens. Smartphones first spread in the industrialized countries, but are rapidly spreading in the newly industrializing countries as well. Therefore, in many cases, the personnel newly hired as workers of manufacturing plants are familiar with handling of smartphones even if they cannot handle PCs. Therefore, when newly designing a GUI screen, it is desirable to consider the design guidelines of GUI screens in smartphones.

There are existing equipment such as PCs or smartphones which newly hired personnel of manufacturing plants can be suitably considered having built up experience in their use. Designs exist of these GUI screens. Further, if ignoring the direction of design of such GUI screens, the time period until the worker using a product would be able to fully use equipment would become longer or all useful functions might not be able to be fully utilized.

Therefore, the algorithm shown below is a procedure stressing efficiency in the case of automatically analyzing the screen of a conventional PC or smartphone by image processing. This is also useful for the purpose of automatic analysis of the GUI screen of a machine using CNC or a robot.

First, an algorithm for analyzing the image data of one GUI screen will be explained. In the analysis of this image data, known image processing technology and optical character recognition (below, referred to as "OCR") technology are utilized. However, in a format where the GUI screen is specified by definitions of attributes and attribute values, if the text display and the display position in the screen and, for text, the font, size, and angle of the text drawn with respect to the horizontal line, arrangement of curved text in an arc or other drawing of text, that information can be utilized for the analysis, but below, the text in the image data has to be read by OCR. The explanation will be given assuming detection of a text region by 100% even if the hit rate of the text itself is not 100%.

Algorithm for Analysis of Text Region

In general, OCR determines a text region then recognizes individual text inside it. Due to OCR processing, the positions of a plurality of text regions are obtained. The processing does not recognize handwritten characters and, further, does not recognize a photographic image captured by a camera, so the rate of success in recognition is so high as to be able to be deemed 100%. If individually evaluating characters, mistaken detection results will sometimes be included, but text regions almost never fail to be recognized.

As grounds for this, there are advances in technology for conditional image enhancement for low quality document images (see "Binarization based on Conditional Image Enhancement and Character Stroke Width for Low-Quality Document", Shujiro Ikeda, Hiromi Yoshida, Yoji Iiguni, Proceedings of the 2014 General Conference of the Institute of Electronics, Information and Communication Engineers) and advances in improvement of performance in analysis by neural network technology and other improvement of recognition rates.

Further, in the present invention, the OCR is applicable to the detection even if the color of the characters are light and the color of the background is dark or even if the color of the characters are dark and the color of the background is light. In terms of the principle, this utilizes the fact that if applying a high pass filter for saturation to the image data, it is possible to detect the edges regardless of the relationship of darkness/lightness of the text color and background color. If edges can be detected, by changing the display color for all pixels so that they invert at the center value of saturation, it becomes possible to detect characters by processing no matter what the case by making the characters dark in color and the background a single color.

When the background of a region where an icon is displayed on a GUI screen is a single color or a single color given shading, only naturally characters can be detected. Even if the background is a real image or a special design image, the characters are made white so that the characters can be read by the user of the GUI screen. Due to this, it is possible to detect characters. In this case, it is assumed that even if the hit rate of the individual characters is low, the text regions can be accurately detected.

Next, the algorithm for obtaining background information from a text region detected by OCR will be explained.

(1-1) Only a text region is cut out from the original image data.

(1-2) The image of the text region is converted into a gray scale of 256 shades.

(1-3) The distribution of the total values of the numbers of pixels in the image corresponding to the different shades of gray colors is obtained.

(1-4) The greatest shade of gray color in the distribution is focused on.

If the background is either a single color or a single color with shading, there is a high possibility that the greatest shade of gray color will reflect the pixels of the background color. If the background is a real image or a special design image, the greatest shade of gray color will either reflect the pixels of the text color or reflect the pixels of the background color.

This shade of the gray color is specified as "A". Here, "A" is still undetermined.

(1-5) The pixels of the shade of gray color ±5 or so from the greatest shade of gray color are extracted. These will be called "pixels near A". Further, the ratio of the total number of pixels near A to the total number of pixels in the text region is calculated. If the ratio is 20% to 40% or so, there is a high possibility that "A" is the text color. If the ratio is 60% to 80% or so, there is a high possibility that "A" is the background color.

The value of the percentage discussed here differs considerably depending on the language. In the case of Indo-European phonetic letters, the proportion of the number of pixels forming the letters in the text region tends to be low, while with ideographic characters such as traditional Chinese characters etc., it tends to be high. In this regard, before using the present invention, it is necessary to identify the type of the display language of the GUI screen of the machine using CNC being detected.

The reason why the text color is not made a single color is that in general, when drawing a font, the background is processed by antialiasing so as to give a smooth feeling to the human visual senses.

(1-6) First, there is a high possibility of there being pixels corresponding to the background color or the text color at the shades separated by ±30 or so or more from the shade A having the greatest total number of pixels with respect to the shades of the gray color obtained from all pixels in the text region. The next greatest shade of gray color leaving aside the shades near A is made "B". If, from the ratio of the total area of the pixels of the shades near A, at the previous stage, there was a high chance that A was the background color, the following routine is executed:

The pixels of shades ±5 or so near B will be referred to as "pixels near B". The ratio of the total number of pixels near B to the total number of pixels of the text region is calculated. If the total ratio of this ratio and the ratio of A becomes 90% or more, it is concluded that A is the background color and B is the text color. In the case of traditional Chinese characters etc., sometimes the proportions of the number of pixels used for representing a character and the number of pixels used for the background color become close to 50:50.

In such a case, for both the ratios of the pixels near B and the pixels near A, the proportion of the number of pixels obtained from the original image data, not the text region, is calculated. At that time, the number of pixels near the color identified as the text color will also become smaller than the number of pixels near the color identified as the background color. Using this, it is possible to conclusively determine the text color and background color.

(1-7) If the total ratio of the number of pixels of the shades near A and the number of pixels of the shades near B to the total number of pixels of a text region is 20% to 50% or so, there is a high possibility that a real image or a special design image was used for the background.

(1-8) In this case, the pixels corresponding to the shades near A are cut out from the total pixels of the text region and the remaining pixels are specified as the C region. The C region is broken down into 256 levels of hue to obtain the distribution of the total number of pixels of the C region with respect to the levels. Further, the C region is broken down into 256 levels of brightness to obtain the distribution of the total number of pixels of the C region with respect to the levels. Here, it is evaluated whether the total number of pixels of the regions at ±5 of the greatest levels of the distributions is 90% or more of the total number of pixels of the C region.

If both the evaluations of the brightness and level are affirmative, the C region is a single color background or a background giving a visual impression close to a single color. If not, it can be determined that the background is a real image or that a special design image is used. Due to this, it can be conclusively determined that A is the text color.

Above, the method of judging a text region was explained. In actuality, by utilizing the Gestalt principles of visual perception, a slight shading effect is used to create an aesthetic effect of making the worker sense a special design. Further, according to the above method, cases may be envisioned where it ends up being determined that the backgrounds of several text regions detected inside a region giving rise to an aesthetic effect are single colors or single colors which are given shading. However, this does not become an inhibiting factor in achieving the object of the present invention of making the GUI screen of the robot consistent with the GUI screen of the machine.

Next, the algorithm for identifying the sizes and layout positions of the figures for separating the figures and background will be explained.

When judging the type of a display element, processing of the figure becomes an issue. When the figure is a company logo or other region displaying a special design, is an icon, is a photograph, or is a bar graph, pie graph, or gauge becomes the question.

The algorithm for identifying a figure will be explained.

Here, assume that, when identifying the sizes and layout positions of figures, the grouping region in which they are held is known. If considering an algorithm for separating the background and figures in the grouping region, the underlying assumed facts are as follows:

(2-1) When the object which can be operated in a grouping region is a figure, the figure is surrounded by the background. GUI designers think that when a worker views a figure, he will focus on the figure and recognize it. Therefore, to enable the figure to be clearly focused on, the region of the background tends to become smaller than the figures inside the grouping region.

(2-2) When a figure does not need to be recognized as an operatable object, the above-mentioned thinking does not stand. Sometimes the entire identified grouping region becomes a special design figure. If not able to separate a background and figure using the following algorithm for detection of background, it can be determined that there is no display element there which a worker can operate.

(2-3) An operable object, that is, icon, can be limited to one of a fixed design fit into a square shape, regular polygonal shape, or regular circle. Other designs are not perceived as icons by a general worker by just viewing them once, so designers of GUIs of industrial equipment normally do not devise icons of vertically long regions or icons of horizontally long regions.

(2-4) Other than a background of a single color or that color given shading, an icon sometimes uses a real image or a special design image as a background. This is the case where a skeuomorphic design icon is present on a background image. In this case, the letters of the name of the icon are displayed drawn by white letters or otherwise drawn in a region separated from the background image. Here, even if the background is a real image or special design image, OCR processing of the entire original image data up to the previous step is used to obtain background information of the text region. This is used as the basis for continued analysis.

(2-5) The meaning of the icon figure is held as data only as a record of change when analyzing the GUI screen by a moving image and is not analyzed otherwise.

As a first example, the case where the background is identified as being a single color or a single color with shading will be explained. As a second example, the general case where the background is a real image or is a special design image will be explained.

The algorithm in the first example becomes as follows:

(3-1) Grouping regions of the same properties as the identified background color are identified. Here, detection of mainly the layout positions of a tool icon menu, skeuomorphic design icons, flat design icons, and other bar shaped gauges or pie graph gauges is envisioned.

(3-2) First, the image processing is executed assuming there is a tool icon menu. What can be detected here is the tool icon menu. Here, if the sizes and layout positions of the figures can be identified, the processing is ended. If it cannot be identified, the routine proceeds to the stage for identifying the next candidate.

The tool icon menu traditionally is a 16×16 pixel rectangular region. A stereoscopic color making the background color appear to float up is arranged at the boundaries of the rectangular shape. The figure, even if a line drawing, may also be a skeuomorphic design, but the background color is a single color. Further, when there are a plurality of icons, they are arranged in parallel to the horizontal direction of the screen at equal intervals or are arranged vertically in the vertical direction at equal intervals. There are also cases of square shapes or rectangular shapes larger than 16×16 pixels. These can also be detected.

Therefore, first, the pixels matching the background color are taken out from the grouping region. The remaining region is made black by binarization. Next, four types of models of 90 degree angles showing the four corners of the rectangular shape are dynamically prepared and pattern matching is executed. If hitting even one among the four models, the horizontal line or vertical line of that one model is increased in length by the amount of 1 pixel and pattern matching of the original four corner model is executed on the increased part.

By using this model showing four corners and the new model increasing the length of one side from the dynamically generated four corner model, the size of the frame of the boundary of the region of each icon of the tool icon menu is conclusively determined. This size can be concluded to be 16×16 or be a rectangular shape larger than that.

After the sizes of the frames of the icons are conclusively determined, pattern matching is used to examine if these are arranged at equal intervals in the horizontal direction or are arranged at equal intervals in the vertical direction. If matching by this, the possibility of being a tool icon menu is high.

Next, it is confirmed that at least something is drawn inside a frame identified by pattern matching.

Using the original grouping region, it is detected if there is an icon-like figure limited to the inside of the identified frame of the icon. Here, the distributions with respect to the hue, saturation, and brightness (value) inside the frame are obtained, but the procedure for obtaining the distributions is not executed at one time for the entire region but is split into regions with a high possibility of presence of a figure and then the respective distributions found. The reason why is that the closer to the center of the frame, the higher the possibility of the presence of pixels for a figure, while the closer to the boundaries of the frame, the higher the possibility of these pixels being accounted for by the background color. Therefore, the starting distribution acquisition region is contracted inward by one pixel from the boundaries of the frame of the icon to obtain a square shaped region including just sides. The distributions are taken there, the background color and the color used for the frame are eliminated, then the total number of pixels remaining is measured. Further, these distributions are divided by the numbers of pixels forming the regions.

Further, the region is further contracted inward by one pixel to obtain a square shaped region including just sides. The next distributions are taken there and the same processing is executed. Finally, the processing is ended at the single point or line at the center of the frame.

At this time, the initial distributions are zero or close to zero. Values of 1 or close to 1 are taken the closer to the final distributions at the center of the frame. Even if distributions closer to the center than the initial distributions are not continuous, the pixels are conclusively determined to show an icon by confirming the larger trends.

Next, the algorithm for judging if an icon is a skeuomorphic design icon or is a flat design icon will be explained. This algorithm enables the presence of a tool icon menu and the position of the same to be automatically determined. Further, even when using a hexagonal shape or other special contour shape icon, if extracting the frame by binarization, similar processing can be used for automatic analysis.

(3-3) Here, the image processing is executed with assuming the presence of a flat design icon. However, in this image processing, it is not possible to determine if the icon displays the status of equipment or the icon results from user operation and response of the screen.

To determine this, it becomes necessary to analyze the moving image data and detect the state of response. However, to measure the trends in design for reproducing the similar impression and supplementing them, it is sufficient to measure the size of flat design icons and the relative positional relationship with other display elements.

One of the features of a flat design icon is that it is a figure of a single color clearly different in saturation value or brightness from a single color background color or is drawn by a coloring giving shading to that single color and generally is drawn so as to fit in a square shape or circle.

Other features are follows: flat design icons for displaying status are not always regularly arranged, but ones for operational use can be assumed to be regularly arranged. When the distance between icons is close, sometimes they are differentiated by colors different from the background color in saturation and brightness. Further, often the text color and the figure color are completely the same or are extremely close.

Therefore the original image are processed with proper algorithms using above features, it is possible to automatically detect the icon positions without viewing by a human designer.

For example, there is the following method. A function is defined giving an unambiguous feature quantity to a pixel at a specific position. This is prepared so that the higher the quantity, the further to the center of the icon. This is evaluated for the entire region inside a grouping region. This being so, the evaluated value is obtained as the height of the pixel position, so by processing the function limited to a region with an icon-like figure, it is possible to measure the center positions of a plurality of icons and the intervals between them. The more equal these are in intervals, the higher the possibility of the icon being a flat design icon.

The method of defining this function is as follows: A plurality of regions are defined so as to draw rings around the pixels. The sizes of the rings are made ones expected as sizes of icons. In each region, the pixels of the background color are eliminated, the distribution of saturation is prepared, and the distribution is divided by the total number of pixels included in the region. These values are added for the center region and the number of regions drawing rings. This being so, when calculating this function at the center of the icon, the value becomes the largest. Away from this, the value becomes slightly smaller. If applying the function to the pixel at the center of a region containing only background, the value becomes zero.

By defining a function for processing such a feature quantity and evaluating the pixels of a region in which presence can be expected one by one, it is possible to accurately measure the center point and size of an icon even without determining the figure of the icon.

The algorithm in the second example becomes as follows:

(4-1) The background color cannot be identified as a single color and it is known that the image is a real image or a special design image, so here it is not attempted to detect a toolbox icon and flat design icon. In such a case, it is examined if there is an icon of a skeuomorphic design present.

(4-2) A grouping region is divided into equal interval rectangular lattice regions. Inside each lattice region, a circular region is specified. This will be called a "lattice circle region". The rectangular shapes are not used as data for determination so as to improve the precision of analysis when a figure is not a square shape, but a hexagonal shape or arc or circle.

The length of one side of the lattice regions is preferably made to match the length of one side of the rectangle occupied by the smallest size character when analyzing the overall image data of the GUI screen by OCR. This is because when the GUI screen is meant to be constantly watched by the worker at a distance of 20 cm to 40 cm, small characters tend to be used. However, when the worker performs other parallel work while making choices in work or when he is only envisioned as checking status, the screen is just kept in the field of vision and large characters tend to be used so as to enable the layout of the GUI to be recognized.

In some case there is no text information and there are only icons, gauges, and display colors showing the status. In this case, 5 mm or so is set and the actual size and number of pixels of the GUI screen are used to conclusively determine the number of pixels corresponding to the diameter of a corresponding lattice circle region.

(4-3) Further, for all of the lattice circle regions, distributions of totals of pixels with respect to 256 levels are obtained for the hue, saturation, and brightness. Further, when parts judged similar in distributions reach 30 to 50% or so in the overall lattice, there is a high possibility of this being a background figure. Other lattice circle regions are any figures, so generally their distributions are not similar. For this reason, there is a high possibility of there being a skeuomorphic design icon in that region.

The processing up to here enables the general range of position of an icon to be estimated, but the position still cannot be identified. Therefore, for this grouping region, pixels with the possibility of an icon being present are removed and morphological component analysis (MCA) applied to restore the original background figure of the pixel region which the different icons overwrote. This algorithm is explained in detail in "Simultaneous Cartoon and Texture Image Inpainting Using Morphological Component Analysis (MCA)", M. Elad, J.-L., Starck, P. Querre, D. L. Donoho, Applied and Computational Harmonic Analysis, August 2005.

Further, by comparing with each other the excluded pixels and the restored pixels and excluding pixels able to be determined as close in hue, saturation, and brightness, it is possible to eliminate the original background from the excluded pixels and possible to make an icon of a skeuomorphic design stick out. In this way, it is possible to identify the size and center position of an icon.

In other words, the background around an icon is treated as the frame region and the figure corresponding to the frame is clarified to identify the center position of the icon of the skeuomorphic design.

(4-4) Further, after that, the existence of any text boxes or list boxes etc. is examined by model matching.

By doing this, it is possible to automatically analyze the trends in the design of the appearance of an icon of the GUI screen of the machine using CNC. There is no need for analysis of the meaning of the icon itself.

Explanation of Algorithm

Note that the typical types and sizes of the fonts are already known by OCR processing at the "algorithm for analysis of text region" explained up to the preceding section.

(5-1) Identify the background: When the image is analyzed, it is assumed that no real image or an image of a figure is placed as the background in the screen.

(5-2) Convert the image to a gray scale gradient and divide into 256 ranges. The total values of pixels in images corresponding to the different shades of gray color are calculated. Due to this, a distribution is obtained of how much gray color corresponding to each shade is contained in the image data. There is a high possibility that the pixels corresponding to the shade of pixels of the highest total value in them form the background. This gray color is referred to as "D". To narrow this down, the pixel position for the shade of gray color ±20 or so from the shade of gray color of the highest total value among them is identified. This is referred to as the "gray color near D". ±20 or so is set because often gradation adding a shading effect to the background is used and to detect this.

Further, from the image data before processing, a binarized image extracting just the pixels covered is generated. This image can be divided into an outside and inside. At the inside, there are bar and pie graphs or other geometric shapes showing indicators and other various UIs.

When the shape of the outside boundary of the binarized image is a simple rectangular shape or rounded corner square shape or bar shape, there is a high possibility that D is the background color. Therefore, the image processing is executed for pattern matching so as to cover the outside of the binarized image. The matching model image is assumed to be a rectangular shape or rounded corner square shape. It is determined whether it matches the outside boundary of the binarized image, where the shape is parallel to the horizontal line of the screen. A complete match is not necessary. It is sufficient that the ratio be 80% or more.

(5-3) The original image data as a whole is processed by OCR. Further, when all of the detected text regions do not overlap the boundaries of the binarized image and there is one or more present inside the binarized image, D is conclusively determined to be the background color.

The RGB values of the background color are obtained by obtaining the RGB values of the pixel corresponding to D from the original image data.

(5-4) The background color is assumed not to be a single color and the remaining three colors of the basic background colors are searched for. Three colors are set because if nothing is found by this search, the background color is assumed to be one color and the routine proceeds to the next step.

(5-5) In a large screen GUI, it is not uncommon that aside from dark color text over a light color background, there be a region including light color text over a dark color background. The above-mentioned method of analysis on the background of the text region is executed for all detected text regions.

Here, background colors other than the one or two background colors determined up to here are all held at those background colors.

(5-6) When not obtained by the method up to here, even if there is another background color with an inverted relationship of darkness/lightness of text color and background color from the background color D, there is a possibility that this is not an operating region of the GUI screen, but a display region of a logo or other figure not covered by detection by OCR.

For example, a logo drawn so as to be dug into the ground of a background giving a special quality feeling in many cases appears as a special design and may not be able to be detected as text by OCR. For such a thing, it is possible to use the distribution of total values of number of pixels to the different shades of grayscale converted image of the original image data to find the shades with high total values of pixels at the outside of the range of ±20 or so from the shade with the greatest number. The discovered shade of gray color will be referred to as "F". It is almost determined that the "F" is the background of a region given a special design separated from general GUI operating regions.

The threshold value for judging F has to be determined in advance so as to become suitable by for example excluding shades from ones having low total values and making the difference where the total value becomes high all at once become 3 times or more the total values of the low shades.

(5-7) Despite the fact that by the analysis up to here, a background color of a single color extracted from a text region was found, if calculating the proportion of that background color from the original image data as a whole, sometimes the proportion as the background color is small. In such a case, the closer to the area of the screen as a whole, the higher the possibility of a real image being specified or a special image given a special design being specified.

On the GUI screen of the machine using CNC, it can be assumed that there is usually no state in which there are no display elements for operation, so by using a search algorithm assuming there is an operating region of the worker such as a rectangular, elliptical, circular, or other operating region at the inside of the image set at the screen as a whole, it is possible to analyze the operational-use region narrowed to part of the region of the screen as a whole.

(5-8) The first narrowed operational-use region can be assumed to have text detectable by OCR. This is based on the machine using CNC being for industrial use for machine operation.

(5-9) By executing OCR processing for the entire original image data and analyzing the background information of the text region as above mentioned, the candidates for the background color are determined. A region in which this background color extends has a high possibility of being a region for operation by the worker.

(5-10) A binarized image is obtained from the original image data as a whole limited to gray color obtained from the background color and close gray color of about ±20 shades from the gray color. This binarized image processed by pattern matching using a rectangular or rounded corner rectangular shape model with the inside cut out to conclusively determine an operational-use region.

If a region with a match of 80% or more, it is possible to identify the shape of the region by removing the part appearing as noise from the part at the outside of the region where a real image or special image is given. Further, it is checked if there is a text region detected by OCR at the inside of the matched region so as to conclusively determine an operational-use region and, further, conclusively determine the background color.

(5-11) Grouping regions are identified.

"Grouping regions" in the case of a GUI screen for operation of industrial equipment separate regions showing the operating status of the equipment and regions to be operated on and separate display regions of corporate logos. They can be identified by taking out regions detected as background color from the original image.

(5-12) Grouping regions are sometimes defined by boundaries of rectangular shapes or general geometric shapes of colors different from the background color. Sometimes there are no such things. When there is no color at all corresponding to the boundaries, the boundaries splitting a grouping region by the positional relationship of display elements are split in any way between the regions of sets of the same types of display elements or boundaries with different background colors.

When there is a color corresponding to the boundaries, a high pass filter is used for the saturation (value) or a high pass filter is used for the hue to detect the edges. Pattern matching is executed for detection so that the edges are straight and close to the width and length of the background region as whole. The pixel positions of the detected positions can be determined as the boundaries of the grouping region.

(5-13) The constantly displayed menu, icon menu, or global navigation are identified.

(5-14) A menu is identified assuming the presence of a text label. The fact of being a menu means that there are the following conventional design patterns, so algorithms that are able to detect these are prepared for each of these.

When there is a text label, OCR processing of the entire region of the original image data up to the preceding procedure and analysis of the text regions produce candidates for the position of the text label and information on the background color.

To determine that a region is not a simple label, is not a text box either, and is not another display element, but is a menu, it is possible to determine whether there are elements arranged in parallel in a vertical array or a horizontal array near the boundaries of the grouping region.

With just a single set of image data, there are limits to this. If there is movie data, the image data after screen response when operating the menu of the screen is used to measure the change of the screen and thereby get information conclusively proving being the menu. So long as conclusive proof of not being a menu is not obtained by automatic analysis of the screen change, the determination of being a menu is not overturned. Conversely, even if determination of being a menu is obtained, if unable to obtain the screen change due to the operation of the worker, the information is held in a form leaving the possibility of the region being a menu or a label.

(5-15) The case including only text, but with specifying a background color: The fact of text regions being arranged in parallel vertically or horizontally and having top and bottom and left and right ends delineated by dark color boundary colors, bars showing boundaries, etc. is detected and confirmed by a high pass filter to identify a menu.

(5-16) The case represented overwritten on nearby display region by pressing specified key of key sheet of equipment. This isn't almost determined by just a single image. Two images of an image where the menu is not displayed and an image where it is displayed are prepared and the difference is taken for detection by OCR.

(5-17) An icon menu or labeled icon can be identified by the method described in the "algorithm for identification of the size or layout position of figure for separating a figure and background" of the previous section.

(5-18) The text entry region and label are identified. This is because the background color of the text entry region is usually white and even when not and there is a difference in the hue, in many cases it is close to the saturation of the background color. If executing pattern matching predicated on this, the position can be identified.

(5-19) The label is found by removing what is present inside the display element discovered by the procedure up to here in the text region identified by OCR. After this, all of the text regions are determined as the label.

(5-20) The remaining unclear regions are determined as images of special design. However, candidates of bar graphs, gauges, and pie graphs are detected in advance by pattern matching. If the status display use bar graphs, gauges, and pie graphs are moving image data, the displayed status sometimes changes along with time. If this is detected, it proceeds to be analyzed. In particular, a 3D shape display region cannot be identified by just a single set of image data. It can be identified by image processing of one set or more of image data in the state contained in the display region and changed in content of display.

The above-mentioned algorithm can be made to be automatically implemented continuously by existing image processing technology. The types and layout of the display elements can be analyzed. With a single set of image data, there will be uncertain types of display elements, but by analyzing moving data and extracting, comparing, and analyzing the changes in the screen due to operational responses of the display elements, it is possible to fill in the missing information and identify the types of the display elements.

With the above method, it is not possible to automatically identify all of the display elements with 100% of precision relying on just image data or moving image data, but an 80% or more precision can be expected. It is possible to further analyze the identified display elements and determine the reliability of identification by a numerical value. By designating a threshold value by which error in identification is determined, the rate of identification of display elements used as the standard for imitation approaches 100%.

Method of Detection of Difference in Display Elements

The "difference" referred to here is not individual icons or other individual designs, but the size, color used, shading effect, etc. of the appearance leaving aside design. For the display elements of the screen of the robot, values corresponding to the attributes of the GUI screen are determined so that those of matching types match the representations on the GUI screen of the machine using CNC down to the detailed parts.

The data of the types and sizes of the display elements and the display positions at the GUI screen of the machine using CNC is already prepared, so next the algorithm for determination of the layout explained above in relation to the second embodiment is executed.

However, icons and fonts have to be prepared so as to correspond to the model of the individual machines at the robot side. For example, in the case of icons, ones corresponding to skeuomorphic designs and ones corresponding to flat designs are prepared at the robot side.

Method for Generating Screen Having Consistency Based on Gestalt Principles of Visual Perception The principles in the Gestalt principles of visual perception, found in cognitive psychology, which can be applied to GUI design are as follows as described in "Designing with the Mind in Mind, Second Edition", Jeff Johnson, in Japanese published by Impress, "Gestalt principles of visual perception":

(a) Proximity: Close objects appear to belong to the same group.
(b) Similarity: Similar objects appear to belong to the same group.
(c) Continuity: Objects tend to be taken not as a plurality of discontinuous parts but as a continuous shape.
(d) Closure: An open shape tries to close.
(e) Symmetry: A complicated object tends to be interpreted as simplified.
(f) Figure/Ground: The brain divides a field of vision as a foreground and background.
(g) Common fate: Simultaneously moving objects are perceived as forming a group or being linked.

There are several methods for applying these for reproducing the similar impression.

Method of Identification of Types of Display Elements Using Gestalt Principles of Visual Perception Expansion of Method of Detection of Background The detection of background explained in the previous section can be improved in precision of detection by an algorithm derived from the Gestalt principles of visual perception.

The method of detection of the background using the figure/ground principle will be explained. This efficiently works even when not designating a photographic image as the background.

If there is a relatively narrow region inside of a relatively wide region of a specific color, a person would strongly tend to interpret the narrow region side as a figure and to interpret the wide region covering it as the ground. A designer would strongly tend to follow this. In particular, a GUI for operation of industrial equipment can be assumed to always follow this so as to prevent mistaken operation by the worker.

This means that it is possible to prepare an algorithm for conversely identifying the background color from the algorithm for detecting an icon at a flat design. The expansion of the method of detection of the grouping region and the proximity principle and the similarity principle are actually applied whether the designer knows of them or does not.

The positional relationship between a label and text box is often one where they are arranged in a line parallel to the horizontal line or they are positioned leaning to one of the left side or right side of a vertical line with the label at the top and the text box arranged right under it. That is, after executing the pattern matching for detecting the objects like text boxes in the previous section, if there is a text region present at an aligned position nearby, it means that the text region is a label and that the label is identified as explaining the text box and substantially cannot be detached. In actuality, it is finally possible to identify a label and text box by accumulation of collateral evidence that they do not contradict the other principles of layout of UI elements.

When a human designer tries to apply the Gestalt principles of visual perception, rather than thinking of a new design, in many cases he utilizes them as guidelines for checking whether the thought up designs are being misunderstood. The checks which a human designer focuses on can be automated by the robot 3 at least in part even if all of it impossible.

Whether the display elements for operation and confirmation of status of the robot 2 automatically added by the present invention would be misunderstood by the worker can be automatically examined by constructing an algorithm applying the continuity principle and closure principle and image processing. For example, the case where the possibility would end up being higher that an added icon will be seen as having continuity with another feature due to determination process corresponding to the continuity principle compared with surrounding features of the image, the case where it would end up being interpreted in another meaning due to determination process corresponding to the closure principle, etc. are examined. By switching what is determined to not-determined alternative display elements, it is possible to avoid automatic addition of display elements which are easy for a worker to misunderstood.

The algorithm of the determination process here may also be one thought of by the development staff of the developer of the robot 3, but may also be derived by machine learning or multilayer neural net technology. For example, when applying a multilayer neural net, there is the method of incorporating processing for smoothly determining the orientation of learning corresponding to the continuity principle of and the closure principle corresponding to the intermediate layer learning principles. "Supervised learning" is executed using data of statistics on whether misunderstandings would occur, obtained from usability tests on human subjects, as input/output. The robot 3 executes the determination algorithm.

When applying this and it is possible to evaluate that skeuomorphic design icons are regularly arranged, the rectangular region covering them can be detected as one grouping region candidate.

According to the present embodiment, the following advantages are obtained.

Even in the general case where the machine manufacturer does not provide combinations of attribute values corresponding to display elements for handling of robots of different companies and, further, the features of the GUI screen of the machine using CNC cannot be obtained in the form of definitions of attributes and values of the same, the image data of the GUI screen of the machine and moving image data are not analyzed by human designers viewing them, but are automatically analyzed by executing image processing with a suitable procedure, so the cost of making the GUI screen of the robot consistent is decreased.

Even when the robot 3 is connected to a machine different from the machine 2, so long as the different machine is configured in the same way as the machine 2, display elements for operation and confirmation of status of the robot 3 on the GUI screen of the different machine are automatically added by a procedure similar to that explained above. In this way, the different designs of the GUI screens of the machines of several manufacturers can be handled automatically by the robot 3 without the intervention of a human designer.

However, the rate of success of analysis of the display elements from the image capture data is not 100% as described also in "Associating the Visual Representation of User Interfaces with their Internal Structures and Metadata", Oct. 15-19, 2011, UIST'11. Default values are used for attribute values which are not specified.

Next, a robot system 1 according to a fourth embodiment will be explained. The robot system 1 according to the present embodiment is configured in the same way as the third embodiment shown in FIG. 13. The robot system 1 is configured so that the display device GUI screen capture processing part periodically captures the screen and the robot controller 4 analyzes the image capture data as required.

In the present embodiment, the "communication network" is assumed to be one in which a real time property is secured so as to enable the captured image to be transferred at a high speed.

Figure 16:
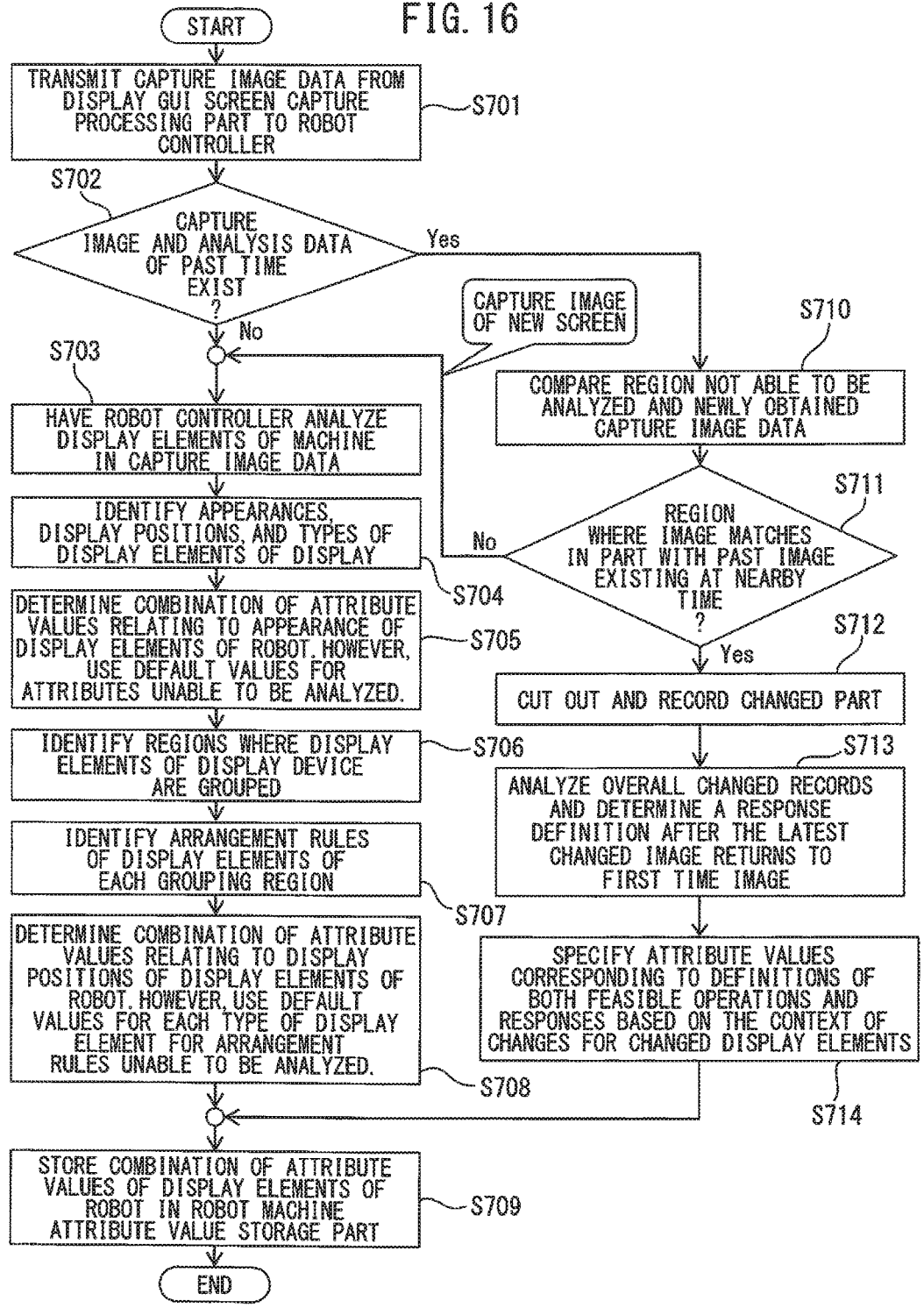
FIG. 16 is a flow chart showing the processing executed in accordance with a fourth embodiment.

FIG. 16 is a flow chart showing the execution procedure in the robot system 1 according to the present embodiment. According to the present embodiment, it is possible to acquire data of the captured image at short time intervals.

The step of analyzing one set of image capture data is executed in the same way as the third embodiment. It is possible to extract changed parts from the data of the plurality of screens acquired at predetermined timings so as to specify the definitions of both feasible operations and responses inside the GUI screen 51.

Further, in the case of a type of display element unable to be identified from a single set of image capture data, it is possible to analyze the context of the screen change so as to verify the appropriateness of the identified attribute value. If the verification process finds error in specific processing, revisions may be made to correct the error.

According to the present embodiment, it is possible to continue to capture images by short periods and measure changes in the GUI screen 51 of the display device 5, so it is possible to detect the definitions of both feasible operations and responses of the display elements of the display device 5. Even in the case of a grouping region of the GUI screen 51 of the display device 5 which is determined as being unable to be identified by analysis of a single GUI screen 51, sometimes it is possible to identify the types of the display elements by analysis of the context of the operation of the worker. Further, it is possible to use the newly found results of analysis as the basis to improve the display of the display elements of the robot at the GUI screen 51 of the display device 5.

FIG. 17 to FIG. 28 show robot systems 1 according to various modifications.

Figure 17:
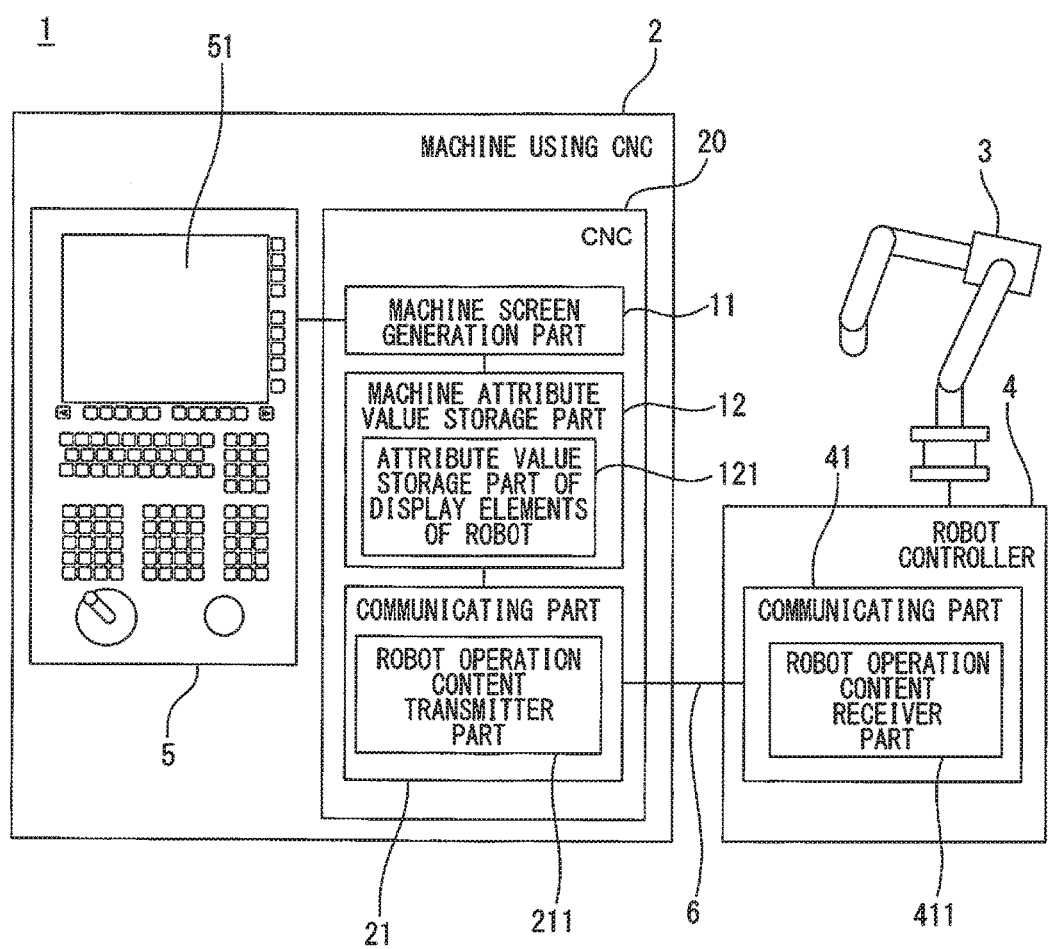
FIG. 17 is a view showing a robot system according to a modification of the first embodiment.

FIG. 17 shows a robot system 1 according to a modification of the first embodiment. In this modification, the machine screen generation part 11 and machine attribute value storage part 12 are built in the CNC 20. In this case, the display device 5 is for example equipped with a touch panel or a combination of a liquid crystal display and mechanical key sheet.

Figure 18:
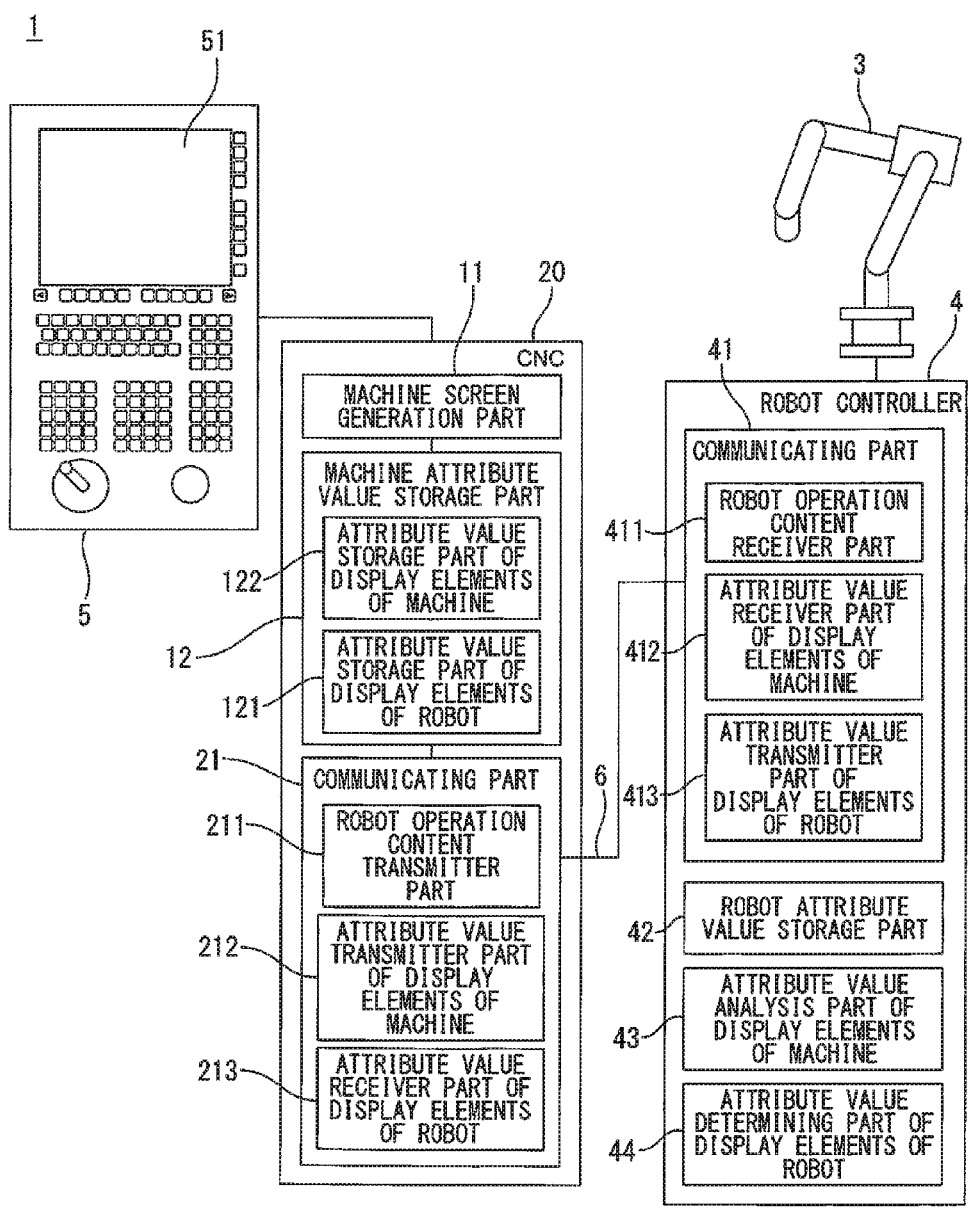
FIG. 18 is a view showing a robot system according to a modification of the second embodiment.

FIG. 18 shows a robot system 1 according to a modification of the second embodiment. In this modification, the machine screen generation part 11 and machine attribute value storage part 12 are built into the CNC 20.

Figure 19:
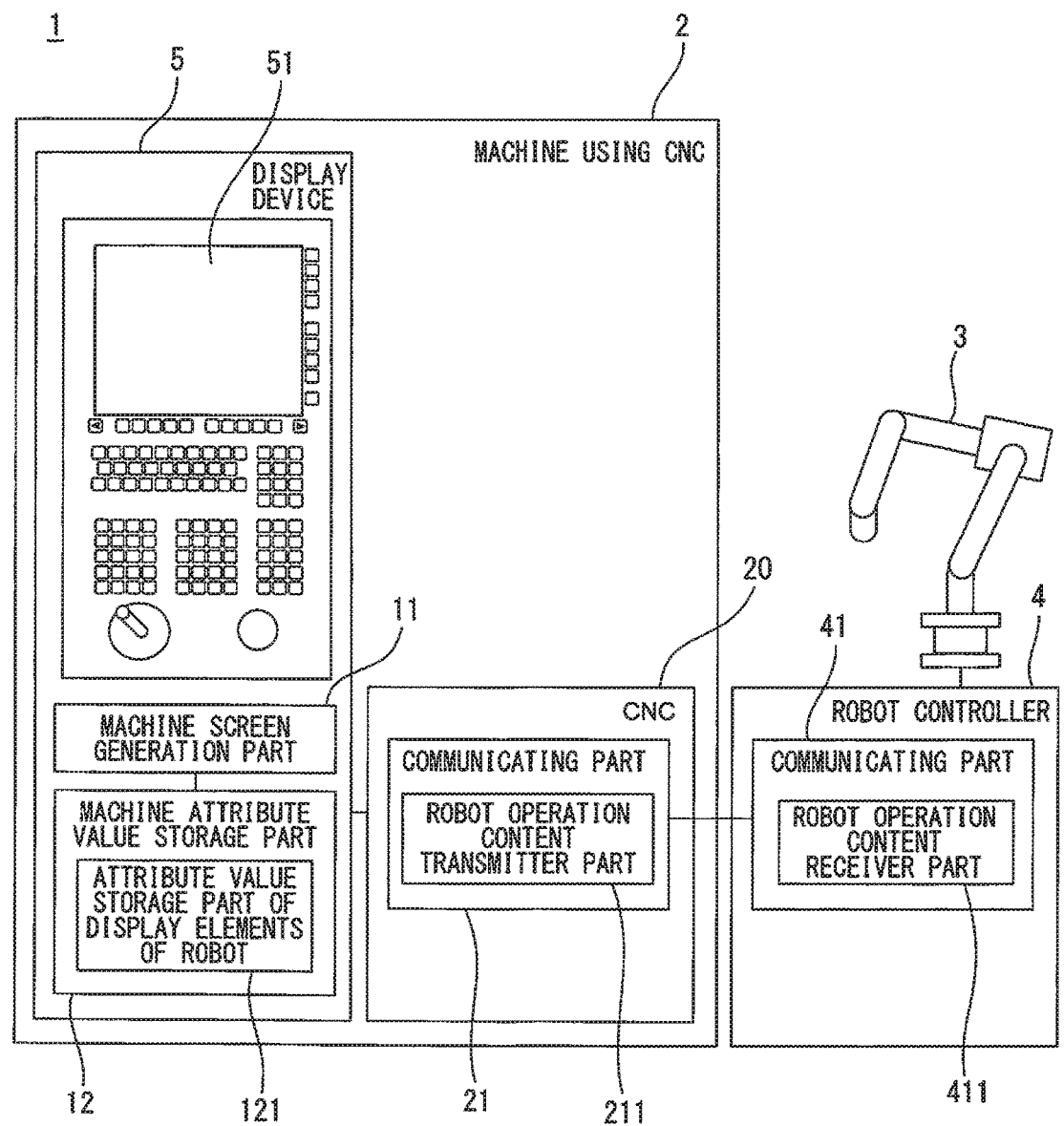
FIG. 19 is a view showing a robot system according to another modification of the first embodiment.

FIG. 19 shows a robot system 1 according to another modification of the first embodiment. In this modification, the machine screen generation part 11 and machine attribute value storage part 12 are built into the display device 5. The display device 5 generates a screen other than at a touch panel or combination of a liquid crystal display and mechanical key sheet or other HCl (Human-Computer Interaction) part or has built in components such as an OS (operating system) memory, large capacity storage disk (HDD (hard disk drive), SSD (solid state disk), etc.), video card, screen control software, etc. In this modification, the CNC 20 is not involved in the generation of the GUI screen 51.

Figure 20:
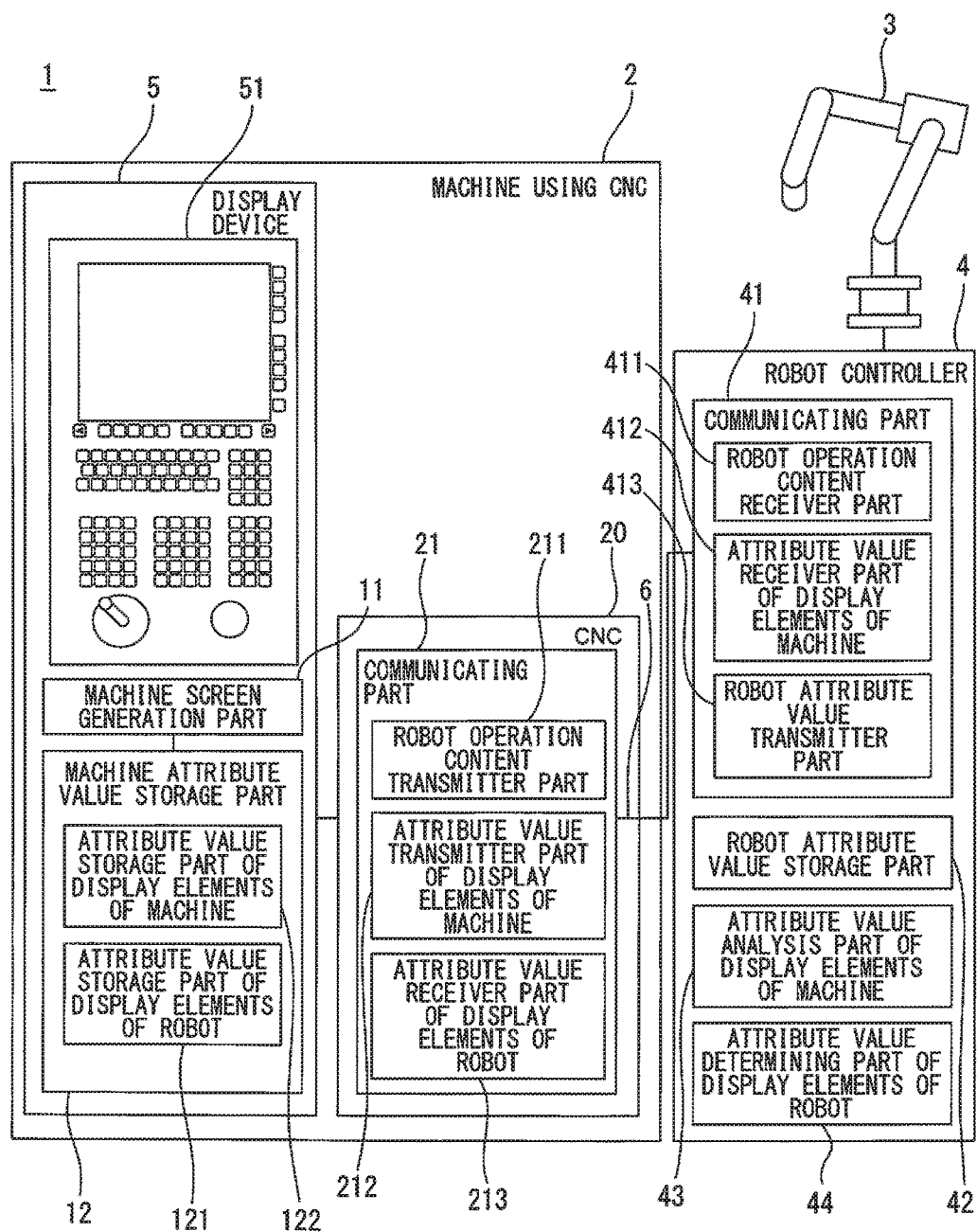
FIG. 20 is a view showing a robot system according to another modification of the second embodiment.

FIG. 20 shows a robot system 1 according to another modification of the second embodiment. In this modification, the machine screen generation part 11 and machine attribute value storage part 12 are built in the display device 5.

Figure 21:
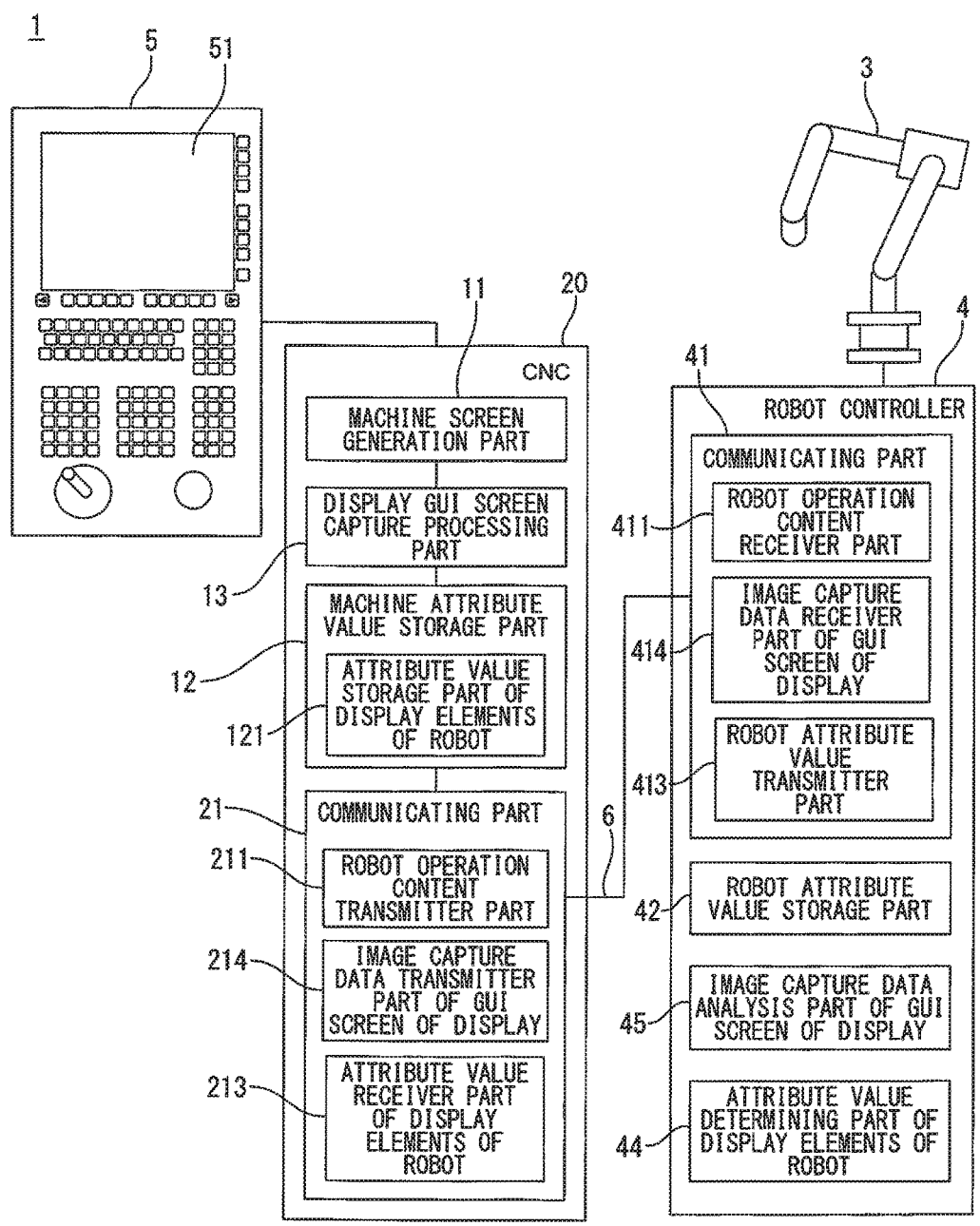
FIG. 21 is a view showing a robot system according to a modification of the third embodiment or fourth embodiment.

FIG. 21 shows a robot system according to a modification of the third embodiment or fourth embodiment. In this modification, the machine screen generation part 11, display device GUI screen capture processing part 13, and machine attribute value storage part 12 are built in the CNC 20.

Figure 22:
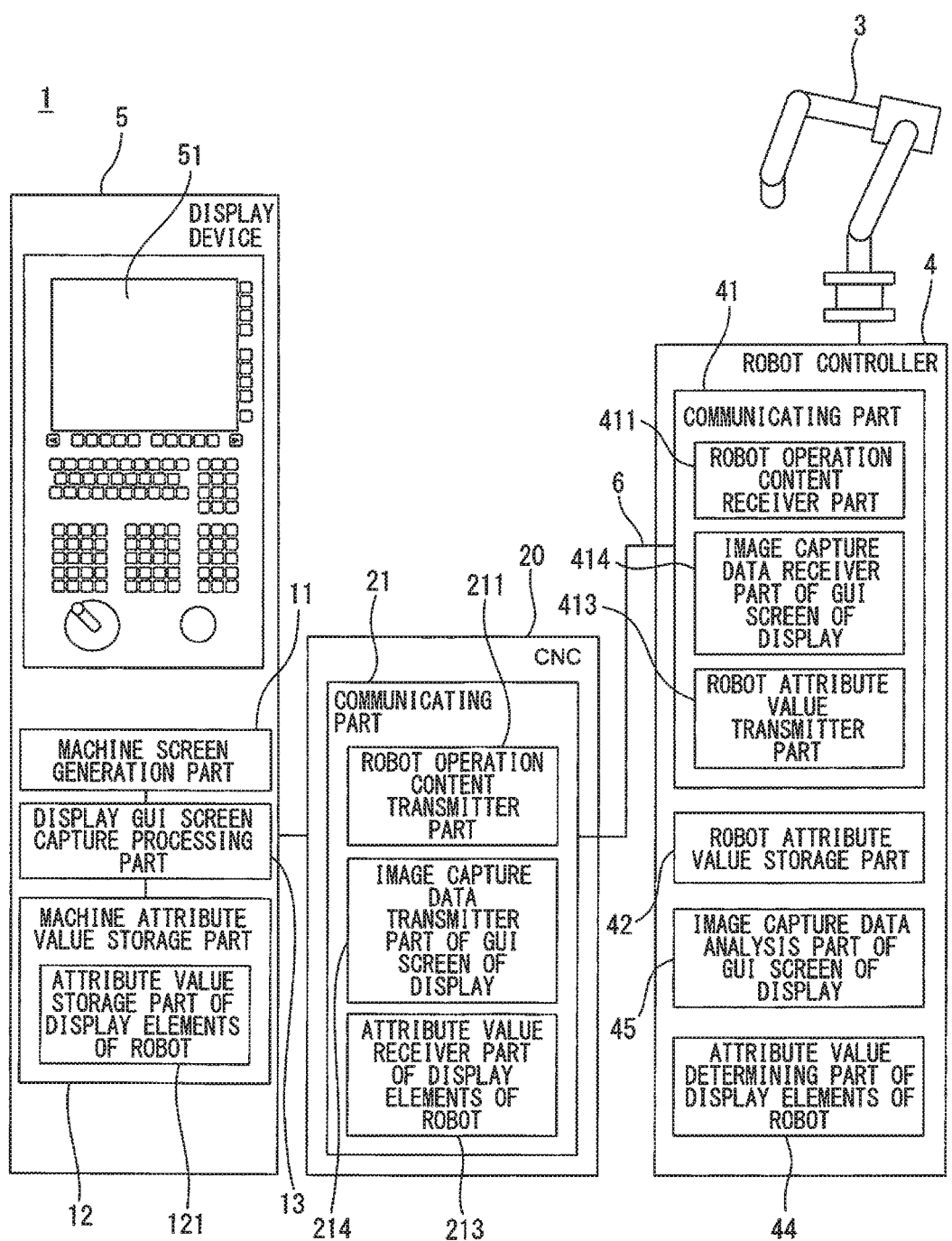
FIG. 22 is a view showing a robot system according to another modification of the third embodiment or fourth embodiment.

FIG. 22 shows a robot system 1 according to another modification of the third embodiment or fourth embodiment. In this modification, the machine screen generation part 11, display device GUI screen capture processing part 13, and machine attribute value storage part 12 are built in the display device 5.

Figure 23:
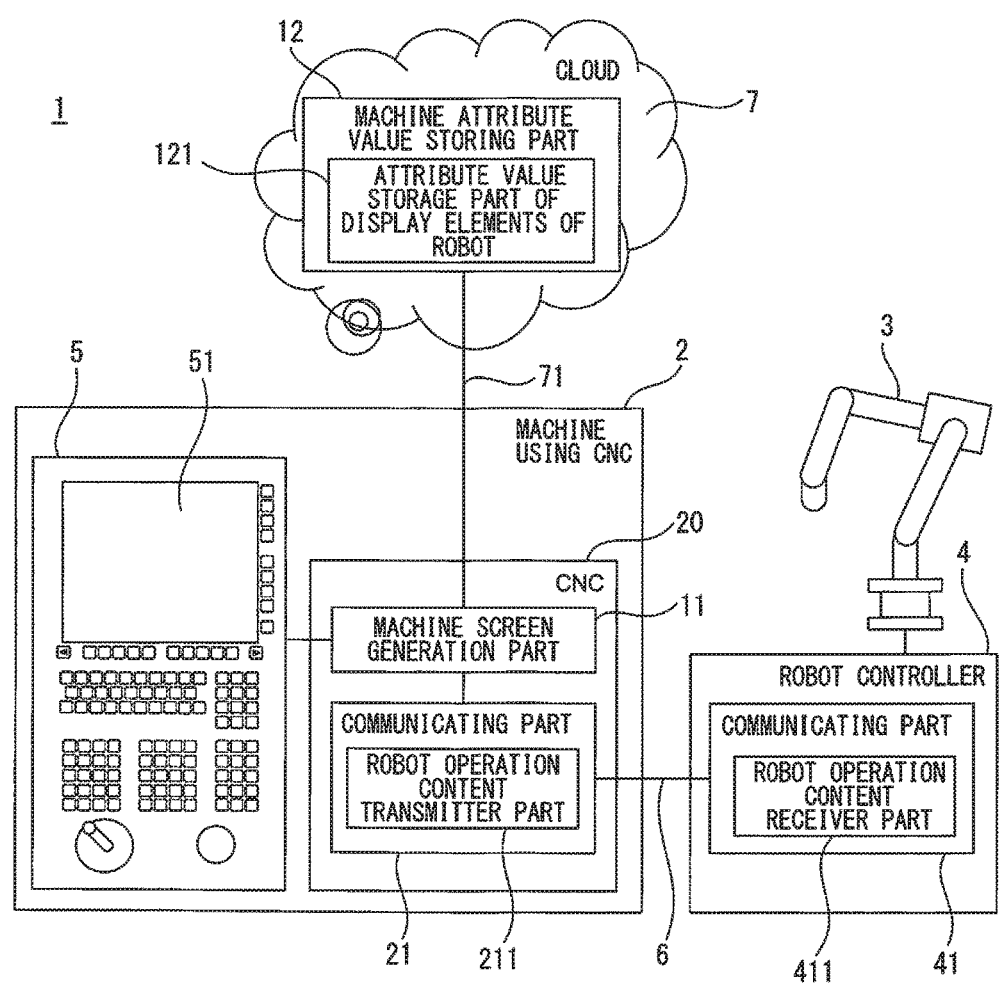
FIG. 23 is a view showing a robot system according to still another modification of the first embodiment.

FIG. 23 shows a robot system 1 according to still another modification of the first embodiment. In this modification, the machine screen generation part 11 is built into the CNC 20. The machine attribute value storage part 12 is provided at a cloud server. The CNC 20 is connected through a cloud communication network 71 to the cloud server 7. The attribute values of the display elements of the robot 3 are transmitted from the cloud server 7 to the machine screen generation part 11 of the CNC 20. When communication between the CNC 20 and robot controller 4 is cut, the display elements of the robot 3 are not displayed on the GUI screen 51.

Figure 24:
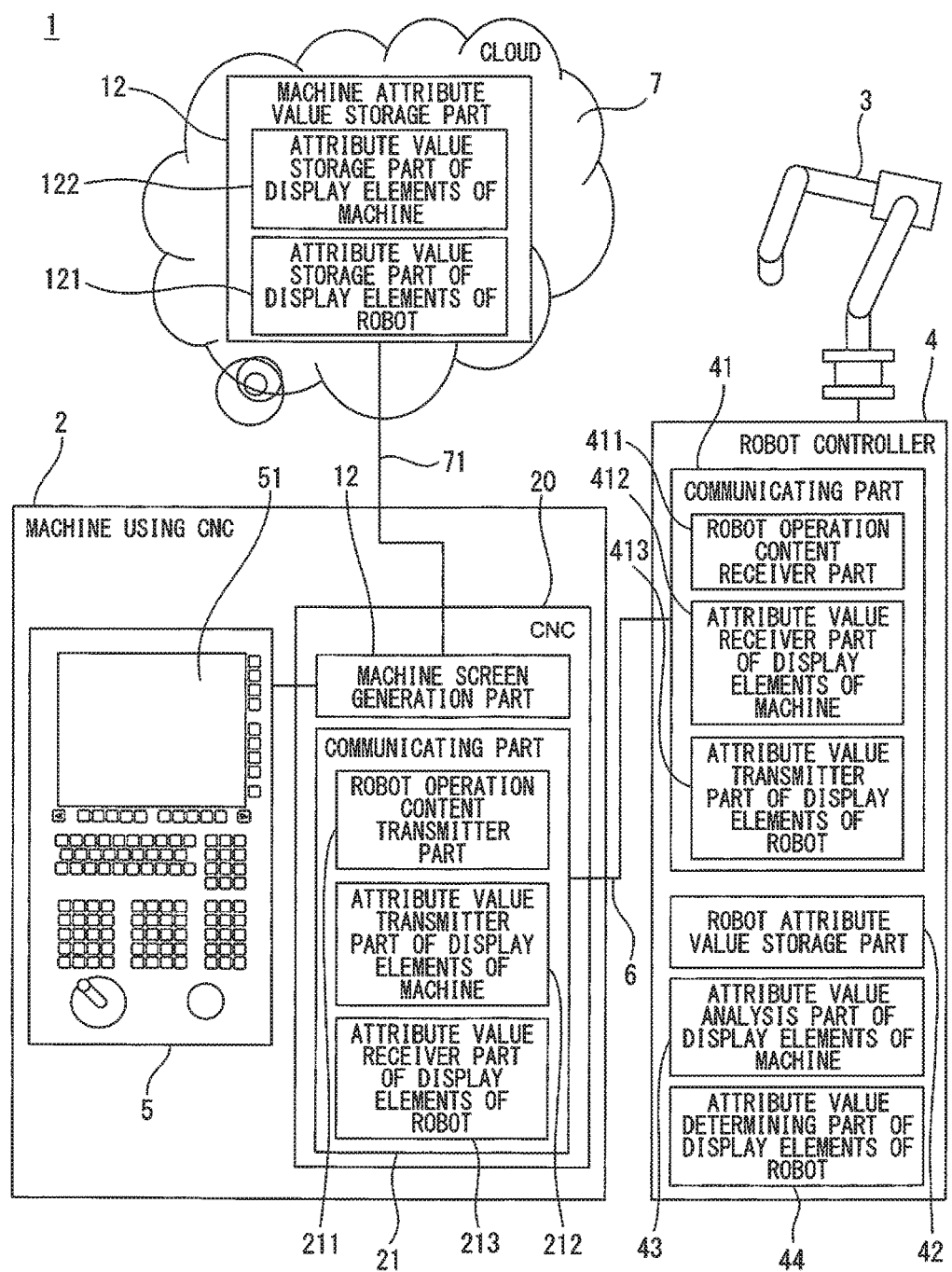
FIG. 24 is a view showing a robot system according to still another modification of the second embodiment.

FIG. 24 shows the robot system 1 according to still another modification of the second embodiment. In this modification, the machine screen generation part 11 is built into the CNC. The machine attribute value storage part 12 is provided at the cloud server. The CNC 20 is connected through the cloud communication network 71 to the cloud server 7.

Figure 25:
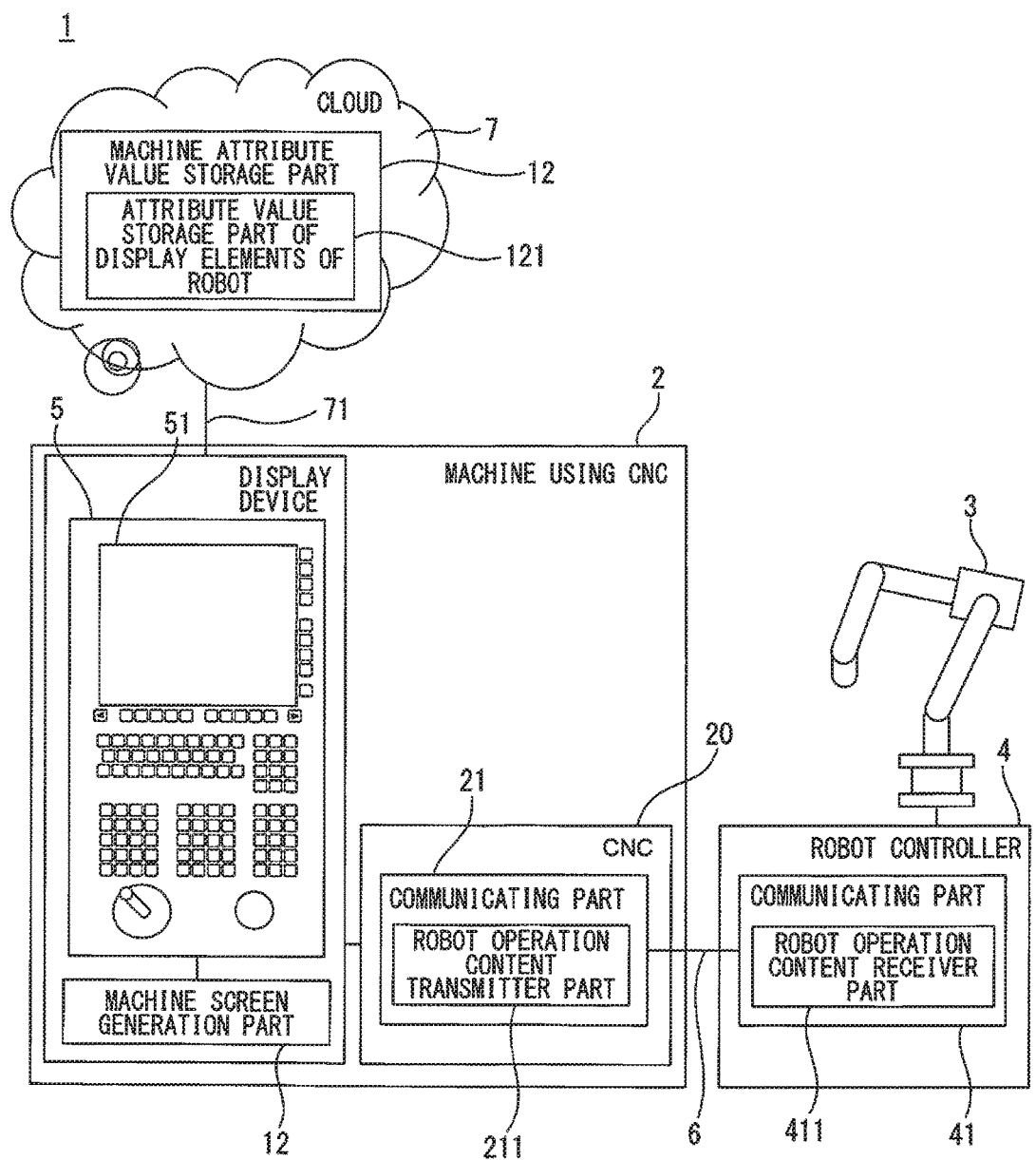
FIG. 25 is a view showing a robot system according to still another modification of the first embodiment.

FIG. 25 shows a robot system 1 according to still another modification of the first embodiment. In this modification, the machine screen generation part 11 is built in the display device 5. The machine attribute value storage part 12 is set in the cloud server 7. The display device 5 is connected through the cloud communication network 71 to the cloud server 7. In this modification, the CNC 20 is not involved in the generation of the GUI screen 51. The attribute values of the display elements of the robot 3 are transmitted from the cloud server 7 to the machine screen generation part 11 of the display device 5. When communication between the CNC 20 and the robot controller 4 is cut, the display elements of the robot 3 are not displayed on the GUI screen 51.

Figure 26:
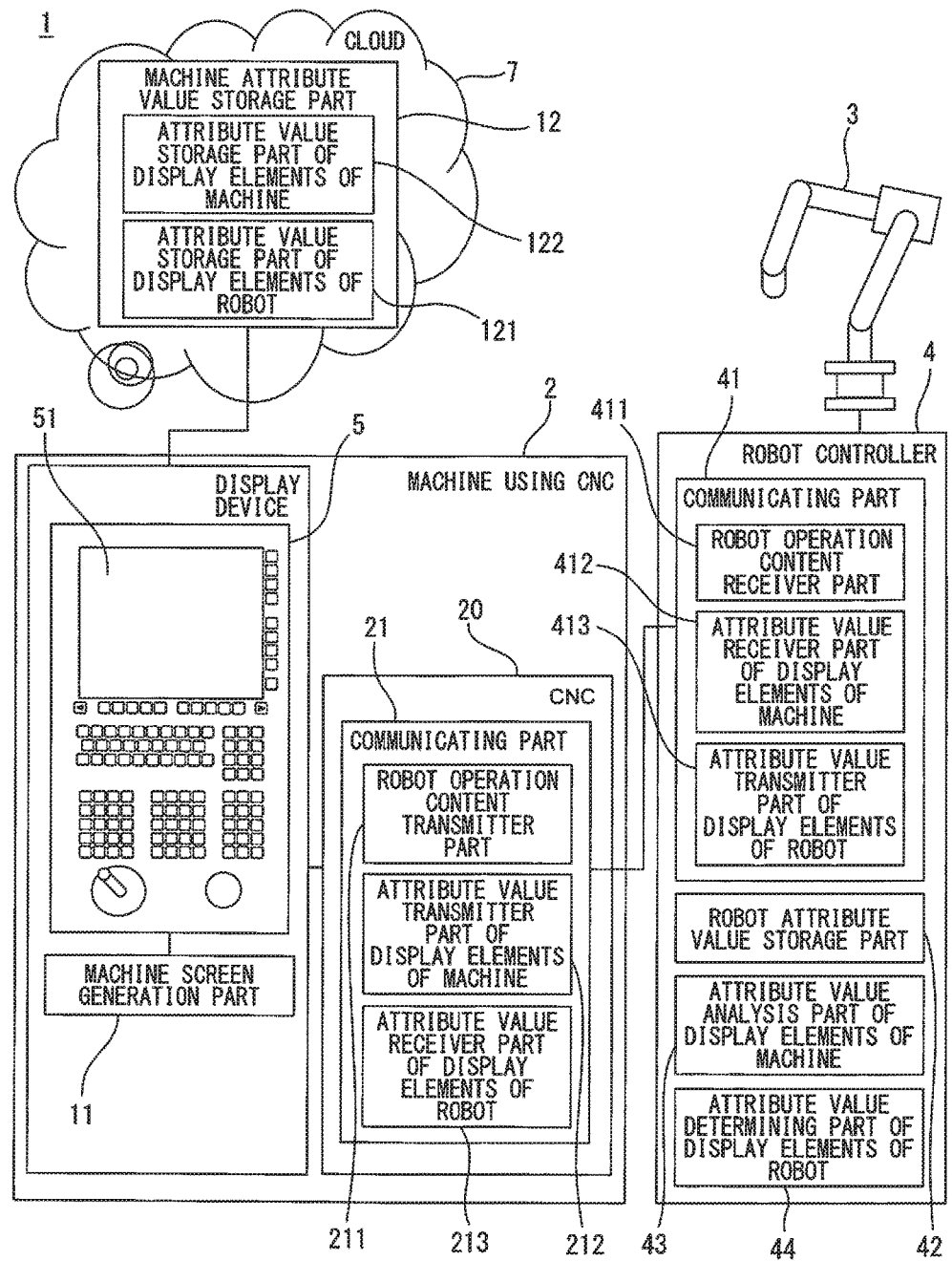
FIG. 26 is a view showing a robot system according to still another modification of the second embodiment.

FIG. 26 is a view showing a robot system 1 according to still another modification of the second embodiment. In this modification, the machine screen generation part 11 is built in the display device 5. The machine attribute value storage part 12 is set in the cloud server 7.

According to a modification utilizing the cloud server 7, when communication is started between the CNC 20 and the robot controller 4, the definitions of the attributes of the display elements of the machine 2 and the information of the model of the robot 3 are transmitted to the cloud server 7. The cloud server 7 transmits the corresponding attribute values of the GUI of the robot 3 to the display device 5 where the GUI screen 51 is generated. In this way, by storing the design of the GUI screen 51 of the machine 2 and the data corresponding to the model of the robot 3 in the cloud server 7, after communication is all established, it becomes possible to quickly confirm the status of the robot 3 and operate it from the machine 2.

Figure 27:
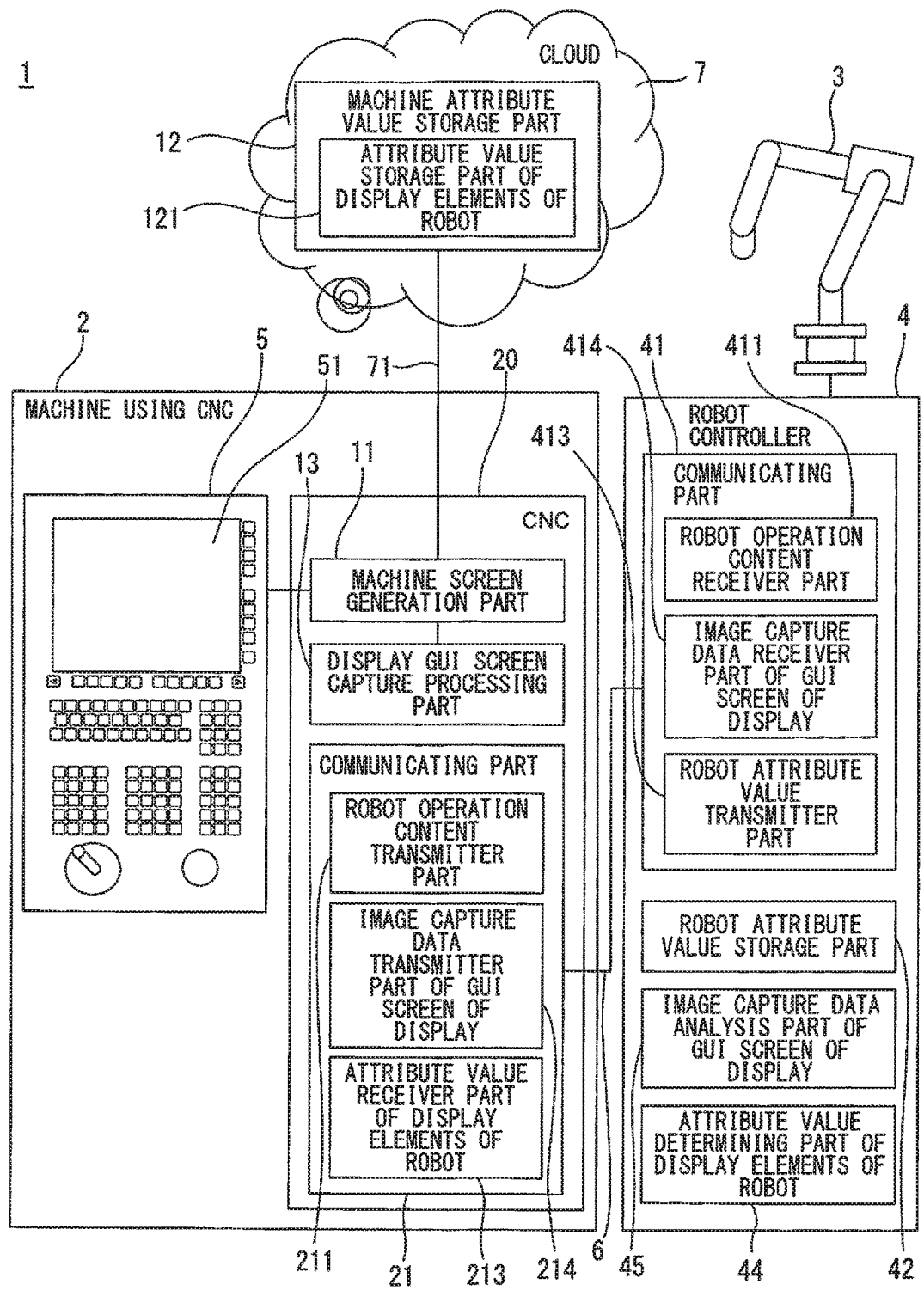
FIG. 27 is a view showing a robot system according to still another modification of the third embodiment or fourth embodiment.

FIG. 27 shows a robot system 1 according to still another modification of the third embodiment or fourth embodiment. In this modification, the machine screen generation part 11 and display device GUI screen capture processing part 13 are provided at the CNC 20. The machine attribute value storage part 12 is provided at the cloud server 7. The CNC 20 is connected through the cloud communication network 71 to the cloud server 7.

Figure 28:
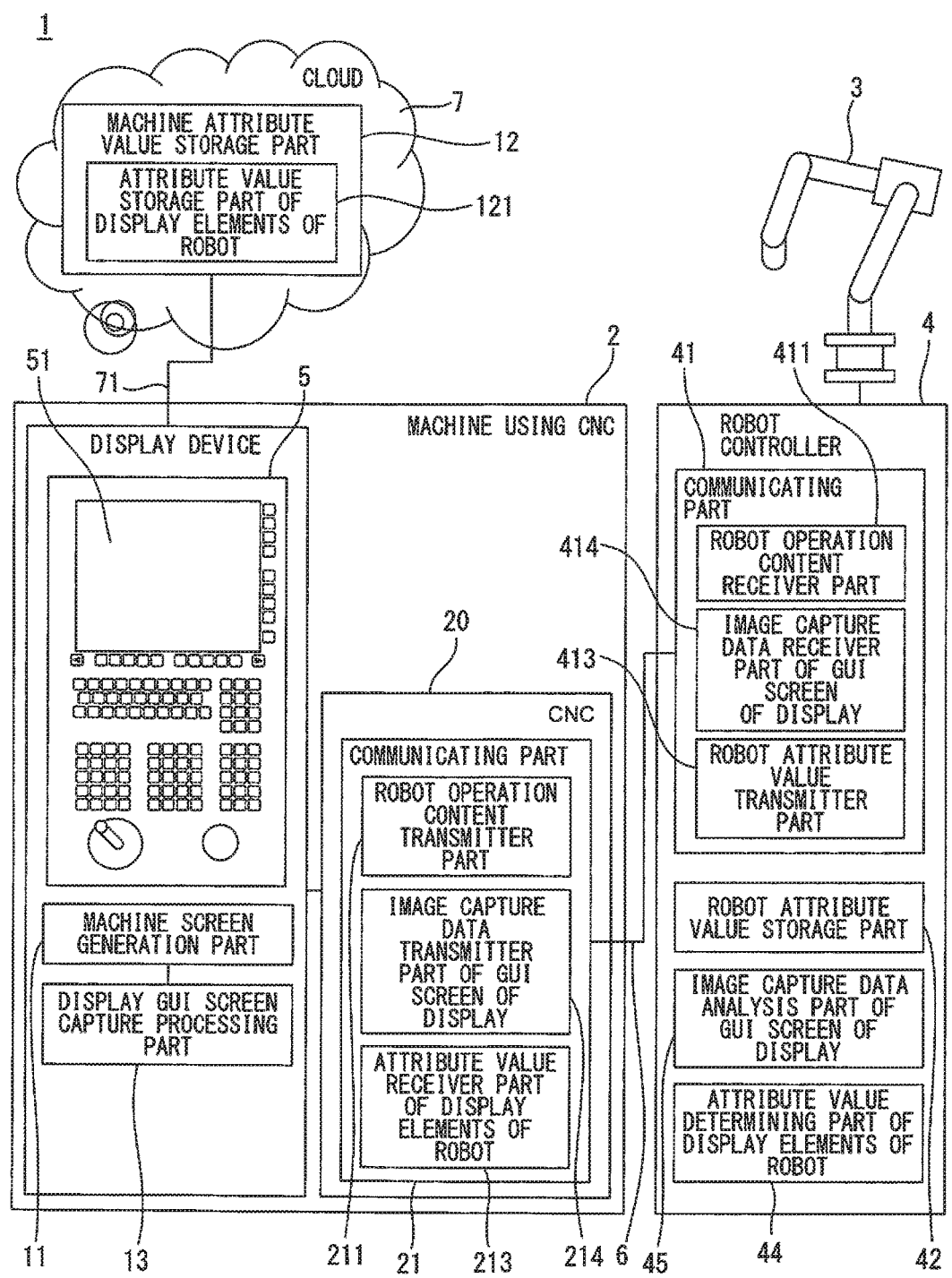
FIG. 28 is a view showing a robot system according to another modification of the third embodiment or fourth embodiment.

FIG. 28 shows a robot system 1 according to still another modification of the third embodiment or fourth embodiment. In this modification, the machine screen generation part 11 and display device GUI screen capture processing part 13 are provided at the display device 5. The machine attribute value storage part 12 is provided at the cloud server 7. The display device 5 is connected through the cloud communication network 71 to the cloud server 7.

According to a robot system according to the present invention, it is possible to obtain the following advantageous effects:

(1) The appearance and operation of the GUI screen of the robot GUI become consistent with the screen of the machine using CNC, so there is little human error on the part of the worker operating the robot. Further, the worker can easily learn and easily master operation of the robot.

(2) Even if a worker of a machine not having sufficient knowledge regarding a robot encounters a situation where he has to operate the robot, he can make a guess as to the operation of the robot based on his knowledge and experience regarding the machine. In particular, the method of display of information relating to the safety of the robot is consistent not with the GUI specifications prescribed by the supplier of the robot but the GUI design specifications used in the machine using CNC. Therefore, the worker can avoid dangerous actions such as approaching a robot which he does not know how to handle and can quickly check the status of the robot.

(3) The machine using CNC has the function of automatically generating a GUI according to a model based on the types of the definitions of the attributes and attribute values for automatically generating the GUI screen. Therefore, if designating values matching with the attributes, the GUI screen of the machine can be suitably switched. Due to this, it is possible to cut the cost of the machine using CNC.

(4) The attribute values are found based on the specifications of the GUI screen of the display device of the machine using CNC. The specifications of the GUI screen can be acquired from the supplier of the machine or an actual machine can be used for examination to obtain the required data. The supplier of the robot can prepare in advance GUI screens matching machines using CNC provided from various suppliers.

(5) It is possible to fetch screen capture data of the GUI screen of the display device of the machine using CNC at the robot controller to thereby automatically analyze the GUI screen of the display device of the machine and find the attribute values. In this case, the supplier of the machine and the supplier of the robot need no longer exchange information on the specifications of the GUI screen between them. Alternatively, the user of the robot system need no longer investigate the specifications of the GUI screen of the machine. If the machine using CNC and the robot can normally start communicating, the attribute values are automatically found. For this reason, the worker can smoothly operate the robot from the machine utilizing the CNC.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the robot system according to the present invention, the appearance and operation of the GUI screen for robot use are made consistent with the GUI screen of the machine utilizing the CNC. Therefore, it is possible to prevent human error of a factory worker in robot operation and possible to help a worker learn the robot operation.

What is claimed is:

1. A robot system including a machine using CNC, a robot controller connected to the CNC through a communication network, and a display device displaying a GUI screen of the machine, the robot system comprising:
   a machine attribute value storage part storing a combination of values corresponding to attributes of the types, appearances, and display positions for addition of display elements of the robot to the GUI screen of the display device and a combination of values corresponding to attributes of various definition types of both operations and responses of the display elements; and
   a machine screen generation part using the combinations of values corresponding to attributes stored in the machine attribute value storage part as the basis to generate and add display elements of the robot to the GUI screen of the machine,
   wherein when the machine attribute value storage part stores combinations of values corresponding to attributes of the display elements of the robot and various definition types of both operations and responses of the display elements, the machine screen generation part is configured to generate the GUI screen of the display device including the display elements of the robot,
   wherein confirmation of status or operation of the robot from the machine is enabled when the CNC and the robot controller are communicating,
   wherein the robot controller further comprises a robot attribute value storage part for adding display elements of the robot and various definition types of both operations and responses of the display elements to the GUI screen of the display device,
   wherein the robot system further comprises:
      a display device GUI screen capture processing part by which the machine captures the GUI screen of the display device to obtain screen capture image data,
      a second transmitter part transmitting the screen capture image data from the display device GUI screen capture processing part via the communication network to the robot controller,
      a third generation part by which the robot controller analyzes the transmitted screen capture image data to identify the appearances, display positions, and types of the display elements of the GUI screen of the display device, makes the values corresponding to the attributes of the appearances of the display elements of the robot stored in the robot attribute value storage part to be added match the appearances identified from the screen capture image data, and prepares a combination of values corresponding to the attributes of the display elements of the robot matching the appearances of the display elements of the GUI screen of the display device, and
      a fourth generation part extracting an arrangement rule of the display elements at a region of the GUI screen of the display device separated by at least utility or purpose by analysis of the positions of the display elements identified from the screen capture image data, applying it to the display elements of the robot stored in the robot attribute value storage part to be added, and preparing a combination of attribute values of the display positions of each display element of the robot,
   wherein the machine attribute value storage part is configured to reflect the combination of values corresponding to the attributes of the display elements of the robot matching the appearances of the display elements of the GUI screen of the display device prepared and the combination of attribute values of the display positions of each display element of the robot prepared via the communication network, and
   wherein the machine screen generation part is configured to again generate a GUI screen of the display as the attribute values of the machine attribute value storage part change.

2. The robot system according to claim 1, wherein
   the second transmitter part is configured to transmit screen capture image data obtained periodically by the display device GUI screen capture processing part via the communication network to the robot controller,
   the fourth generation part is configured to analyze the newly acquired screen capture image data compared with the obtained past image data each time the robot controller acquires it, identify the content of the operational response of the GUI screen of the display device, and prepare a combination of attribute values of the various definition types of both operations and responses of the display elements of the robot stored in the robot attribute value storage part to be added, and
   the machine attribute value storage part is configured to reflect the prepared combination of attribute values of the various definition types of both operations and responses of the display elements of the robot to be added via the communication network.

* * * * *